United States Patent
Bernadini et al.

(10) Patent No.: US 11,618,014 B2
(45) Date of Patent: Apr. 4, 2023

(54) METHOD OF COATING A SUBSTRATE WITH A PARTICLE STABILIZED FOAM

(71) Applicant: Johnson Matthey Public Limited Company, London (GB)

(72) Inventors: Cecilia Bernadini, Reading (GB); Thomas Campbell, Royston (GB); Guy Richard Chandler, Royston (GB); Christopher Daly, Royston (GB); Katharine Ann Hardstone, Reading (GB); Thomas Hotchkiss, Royston (GB); David Thompsett, Reading (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 15/483,095

(22) Filed: Apr. 10, 2017

(65) Prior Publication Data
US 2017/0304810 A1    Oct. 26, 2017

(30) Foreign Application Priority Data
Apr. 11, 2016 (GB) .................................. 1606133.5

(51) Int. Cl.
*B01J 29/76* (2006.01)
*F01N 13/00* (2010.01)
(Continued)

(52) U.S. Cl.
CPC ........ *B01J 29/763* (2013.01); *B01D 53/9418* (2013.01); *B01J 21/04* (2013.01);
(Continued)

(58) Field of Classification Search
CPC ...... B01J 29/763; B01J 37/0219; B01J 35/04; B01J 35/0006; B01J 21/04; B01J 35/026;
(Continued)

(56) References Cited

U.S. PATENT DOCUMENTS 6,599,570 B1    7/2003   Aderhold et al.
7,727,498 B2    6/2010   Hodgson et al.
(Continued)

FOREIGN PATENT DOCUMENTS

CN    104069781 A    10/2014
CN    105254387 A    1/2016
(Continued)

OTHER PUBLICATIONS

Ha, et al.; A novel method of coating a particle-stabilized alumina foam on a porous alumina substrate; Materials Letters 88 (2012) 40-42.
(Continued)

*Primary Examiner* — Wayne A Langel

(57) ABSTRACT

A method of coating a substrate with a foam is described. The method comprises:
(a) introducing a foam into a substrate comprising a plurality of channels through open ends of the channels at a first end of the substrate; and
(b) applying at least one of (i) a vacuum to open ends of the channels at a second end of the substrate and (ii) a pressure to the open ends of the channels at the first end of the substrate;
wherein the foam comprises a particulate material, and wherein the foam is particle stabilized.

14 Claims, 12 Drawing Sheets

(51) Int. Cl.
   *F01N 3/035* (2006.01)
   *F01N 3/10* (2006.01)
   *F01N 3/28* (2006.01)
   *F01N 3/20* (2006.01)
   *B01J 35/00* (2006.01)
   *B01J 21/04* (2006.01)
   *B01D 53/94* (2006.01)
   *B01J 35/10* (2006.01)
   *B01J 37/02* (2006.01)
   *B01J 37/08* (2006.01)
   *B01J 23/42* (2006.01)
   *B01J 35/04* (2006.01)
   *B05D 7/22* (2006.01)
   *B01J 35/02* (2006.01)

(52) U.S. Cl.
   CPC ............ *B01J 23/42* (2013.01); *B01J 35/002* (2013.01); *B01J 35/0006* (2013.01); *B01J 35/026* (2013.01); *B01J 35/04* (2013.01); *B01J 35/1076* (2013.01); *B01J 37/0215* (2013.01); *B01J 37/0236* (2013.01); *B01J 37/08* (2013.01); *B05D 7/22* (2013.01); *F01N 3/035* (2013.01); *F01N 3/106* (2013.01); *F01N 3/2066* (2013.01); *F01N 3/2803* (2013.01); *F01N 3/2828* (2013.01); *F01N 13/009* (2014.06); *B01D 2255/2092* (2013.01); *B01D 2255/20761* (2013.01); *B01D 2255/50* (2013.01); *F01N 2250/02* (2013.01); *F01N 2330/00* (2013.01); *F01N 2330/06* (2013.01); *F01N 2330/22* (2013.01); *F01N 2370/04* (2013.01); *Y02T 10/12* (2013.01)

(58) Field of Classification Search
   CPC .... B01J 37/08; B01J 37/0215; B01J 37/0236; B01J 35/1076; F01N 13/009; F01N 3/106; F01N 3/2066; F01N 3/2803; F01N 3/2828; F01N 3/035; F01N 2330/06; F01N 2330/22; F01N 2370/04; F01N 2330/00; F01N 2250/02; B01D 53/9418; B01D 2255/20761; B01D 2255/50; B01D 2255/2092; Y02T 10/24
   USPC .......................................................... 502/64
   See application file for complete search history.

(56) References Cited

U.S. PATENT DOCUMENTS

| | | | |
|---|---|---|---|
| 2003/0180197 A1* | 9/2003 | Nunan | F01N 3/2853 502/355 |
| 2005/0031514 A1 | 2/2005 | Patchett | |
| 2006/0039843 A1 | 2/2006 | Patchett et al. | |
| 2007/0144828 A1 | 6/2007 | Galligan | |
| 2008/0146439 A1 | 6/2008 | Hanaki et al. | |
| 2009/0196812 A1 | 8/2009 | Bull et al. | |
| 2011/0179777 A1 | 7/2011 | Chandler et al. | |
| 2014/0044626 A1* | 2/2014 | Greenwell | F01N 3/101 423/212 |

FOREIGN PATENT DOCUMENTS

| | | |
|---|---|---|
| CN | 105888782 A | 8/2016 |
| DE | 102007002903 A1 | 8/2008 |
| EP | 1057519 A1 | 12/2000 |
| GB | 2535327 A | 2/2016 |
| JP | 2002253968 A | 9/2002 |
| JP | 2008168278 A | 7/2008 |
| JP | 4975209 B2 | 7/2012 |
| KR | 20010081994 A | 8/2001 |
| KR | 20140011508 B1 | 1/2014 |
| KR | 20140019895 A | 2/2014 |
| KR | 20140110932 A | 9/2014 |
| RU | 2011104476 A | 8/2012 |
| WO | 9429525 A1 | 12/1994 |
| WO | 9524270 A1 | 9/1995 |
| WO | 9947260 A1 | 9/1999 |
| WO | 1999047260 A1 | 9/1999 |
| WO | 0024559 A1 | 5/2000 |
| WO | 2001080978 A1 | 11/2001 |
| WO | 2007068127 A1 | 6/2007 |
| WO | 2011080525 A1 | 7/2011 |
| WO | 2013050784 A2 | 4/2013 |
| WO | 2013088128 A1 | 6/2013 |
| WO | 2013088132 A1 | 6/2013 |
| WO | 2013088133 A1 | 6/2013 |
| WO | 2013160678 A2 | 10/2013 |
| WO | 2014195685 A1 | 12/2014 |
| WO | 2015145122 A2 | 10/2015 |
| WO | 2016128720 A1 | 8/2016 |
| WO | 2016130456 | 8/2016 |
| WO | 2017019958 A1 | 2/2017 |
| WO | 2017178801 A1 | 10/2017 |

OTHER PUBLICATIONS

Ahmad et al.; Synthesis of open-cell particle-stabilized Al2O3 foam using Al(OH)3 particles; Scripta Materialia 76 (2014) 85-88.

Rouquerol et al.; Recommendations for the Characterization of Porous Solids; Pure & Appl. Chern., vol. 66, No. 8, pp. 1739-1758, 1994.

* cited by examiner

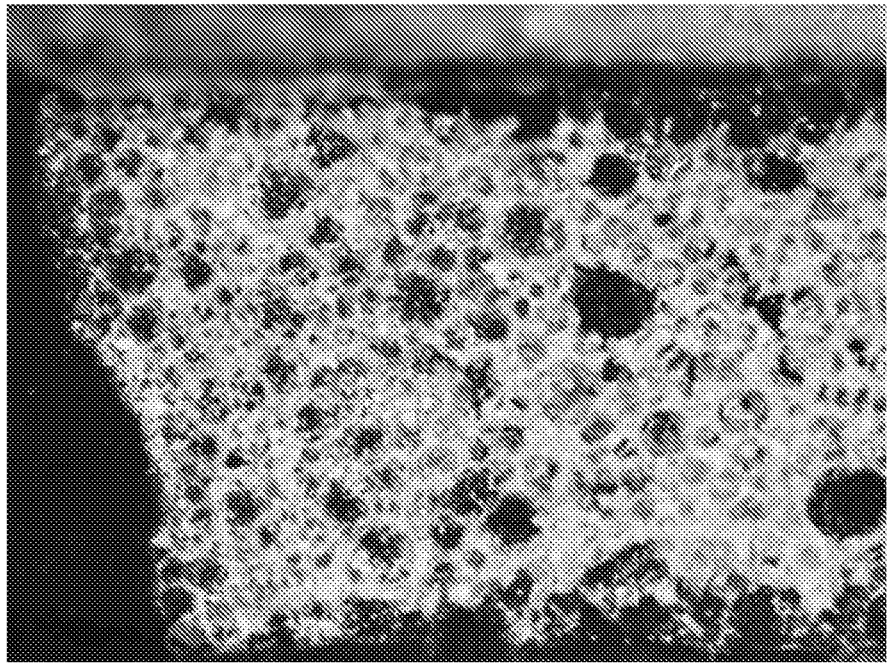
FIG. 9A - Foam Coating Image
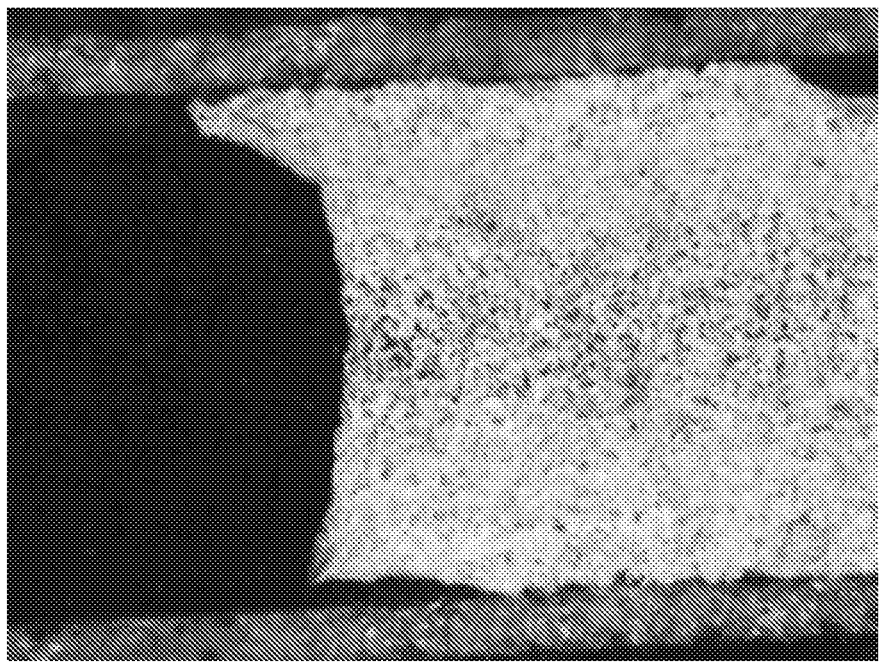
FIG. 9B - Standard Coating Image

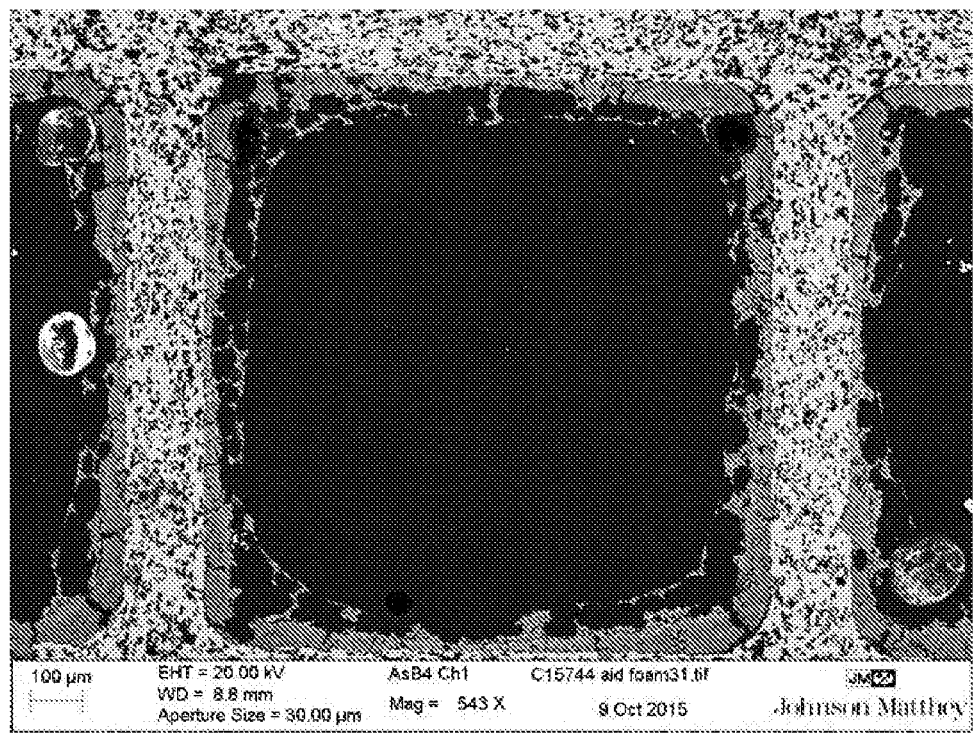
FIG. 10A - Foam Coating SEM
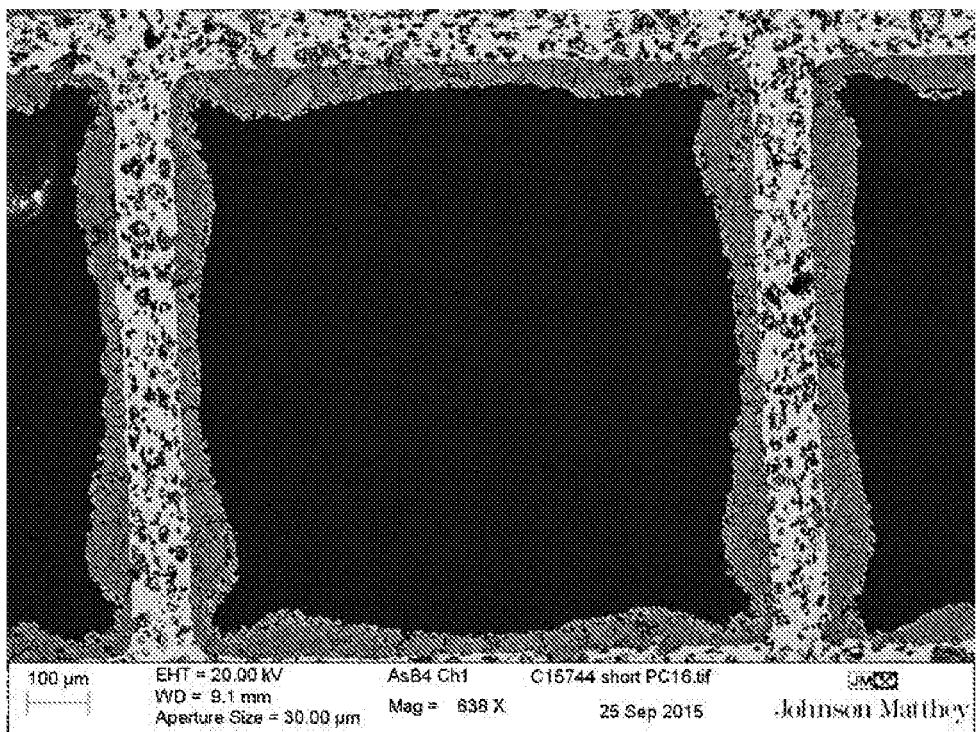
FIG. 10B - Standard Coating SEM

METHOD OF COATING A SUBSTRATE WITH A PARTICLE STABILIZED FOAM

CROSS REFERENCE TO RELATED APPLICATIONS

This application claims priority benefit to Great Britain Patent Application No. 1606133.5 filed on Apr. 11, 2016, which is incorporated herein by reference.

FIELD OF THE INVENTION

The invention relates to a method of coating a substrate with a particle stabilized foam. The coated substrate is for use in an emissions control device for treating or removing pollutants from an exhaust gas produced by an internal combustion engine. The invention further relates to an emissions control device comprising a substrate and a solid foam layer, and to uses of the emissions control device.

BACKGROUND TO THE INVENTION

Emissions control devices (e.g. catalysts, such as three-way catalysts or diesel oxidation catalysts) for treating the exhaust gas of an internal combustion engine in both mobile and stationary applications typically include a substrate (e.g. a honeycomb monolith substrate) coated with a liquid that comprises a catalyst component. Problems can arise during the coating process that can depend on the properties of the substrate that is to be coated (e.g. size of the channels, the material from which the substrate is made and its porosity) and the properties (e.g. rheology) of the liquid that is used to form the coating. Various methods and apparatus have been developed by manufacturers of emissions control devices to address these problems.

WO 2007/068127 A1 describes a method to prepare wet foams exhibiting long-term stability wherein partially lyophobized colloidal particles are used to stabilize the gas-liquid interface of a foam. In one aspect, the particles are partially lyophobized in-situ by treating initially hydrophilic particles with amphiphilic molecules of specific solubility in the liquid phase of the suspension. However, WO 2007/068127 A1 does not disclose or teach any coating applications.

In "a novel method of coating a particle stabilized alumina foam on a porous alumina substrate," Materials Letters, 88, 40-42, 2012, Ha et al. have described a method of coating a particle stabilized alumina foam on a porous alumina substrate without the use of an external force to apply the foam. A dip-coating process was used that relied on a capillary force to draw the foam over the porous alumina substrate.

The synthesis of open-cell particle stabilized $Al_2O_3$ foam using $Al(OH)_3$ particles has been described, see Scripta Materialia, 76, 85-88, 2014. The produced liquid foam was shaped using Perspex™ molds before controlled drying. No external force was applied.

DE 102007002903 A1 describes a process to apply a catalytic washcoat to a substrate. The washcoat is either gassed or de-gassed prior to application. To achieve the desired gas content, the air bubbles are stabilized or destabilized through the addition of specific additives (surfactants/defoamers).

SUMMARY OF THE INVENTION

The inventors have surprisingly found that coating a substrate with a particle stabilized foam can achieve certain advantages to overcome the shortcomings of using a washcoat in common coating methods for manufacturing emissions control devices. The use of a particle stabilized foam in such methods provides excellent control over short-depth dose coating, and even coating layers can be applied to the substrate. The use of larger dosages of washcoat than is necessary can also be avoided.

The invention relates to a method of coating a substrate with a foam. The method comprises:
(a) introducing a foam into a substrate comprising a plurality of channels through open ends of the channels at a first end of the substrate; and
(b) optionally applying (i) a vacuum to open ends of the channels at a second end of the substrate and/or (ii) a pressure to the open ends of the channels at the first end of the substrate;
wherein the foam comprises a particulate material, and wherein the foam is particle stabilized.

The invention allows the manufacture of a coated substrate having a porous solid foam layer. Such a coated substrate may possess one or more advantages compared to a coated substrate coated using a conventional washcoat process. The coated substrate may be used as, or form part of, an emissions control device.

An emissions control device having a porous solid foam layer disposed on a substrate may show reduced back pressure in an exhaust system when compared to an identically formulated emissions control device that has been manufactured from a washcoat. A reduction in back pressure is particularly advantageous for emissions control devices that comprise a filtering substrate, such as a filtering honeycomb monolith substrate. The open cell structure of the solid foam layer may readily allow the passage of exhaust gas through the layer and the pores can aid the collection of soot.

The porous solid foam layer typically has a high specific surface area in comparison to layers having the same composition that have been manufactured by a conventional washcoating process. The high specific surface area can result in an improvement in the activity of the emissions control device.

The porous solid foam layer has a rough surface, which can provide excellent contact between the components of the solid foam layer (e.g. catalytic material) and any soot captured from the exhaust gas on the solid foam layer. This surface roughness may enhance oxidation of the soot, such as when $NO_2$ or $O_2$ are used as oxidants.

The invention further provides a solid foam layer. The solid foam layer is obtained or obtainable by the method of the invention.

The invention further provides an emissions control device for treating or removing pollutants from an exhaust gas produced by an internal combustion engine. The emissions control device comprises a solid foam layer disposed or supported on a substrate, which is obtained or is obtainable from a method for coating a substrate with a foam of the invention. Additionally or alternatively, the emissions control device comprises a substrate and a solid foam layer having an open cell structure, wherein the solid foam layer is disposed or supported on the substrate. The substrate typically comprises a plurality of channels.

The invention also relates to an exhaust system for treating or removing pollutants from an exhaust gas produced by an internal combustion engine. The exhaust system comprises an emissions control device of the invention.

Further aspects of the invention relate to methods and uses of the emissions control device.

A first method aspect of the invention is a method of treating or removing pollutants from an exhaust gas produced by an internal combustion engine. The method comprises the step of passing an exhaust gas produced by an internal combustion engine through an emissions control device in accordance with the invention. The method may also be a method of avoiding a build-up in back pressure within an exhaust system of an internal combustion engine.

A first use aspect of the invention relates to the use of an emissions control device in an exhaust system of an internal combustion engine to avoid a build-up in back pressure within the exhaust system.

In the first method and use aspects of the invention, the substrate (i.e. of the emissions control device comprising a solid foam layer) is a filter substrate, such as a filtering honeycomb monolith substrate.

Backpressure is a critical property of automotive catalysts. Increases in backpressure can cause the engine to perform additional mechanical work and/or can result in less energy being extracted when an exhaust turbine is used. This can result in increases in fuel consumption, particulate matter and CO emissions and higher exhaust temperatures. As emission standards, i.e. the quantities of pollutants it is permissible to emit from a vehicle, e.g. Euro 5 and Euro 6, become ever tighter they are also including legislated requirements for in-use on-board diagnostic (OBD) verification of continuing catalyst efficacy. OBD requirements are particularly relevant to catalyzed filters as vehicle manufacturers typically include periodic active removal of particulate matter held on the filter in their vehicle design to maintain efficient engine performance, in which exhaust gas temperatures are increased using e.g. engine management of fuel injection and/or fuel is injected into the exhaust gas downstream of the engine and combusted on a suitable catalyst. As vehicle manufacturers are demanding catalyst products capable of whole (vehicle) life endurance, manufacturers of catalyzed filters seek to counteract catalyst deactivation over time by loading the filter with as much catalyst as possible at the outset.

Engine exhaust backpressure can cause a number of problems in modern engines, especially in diesel engines fitted complex aftertreatment systems and especially with diesel particulate filters (DPF). The main source of increased back pressure comes from soot accumulation on diesel particulate filters. If the diesel particulate filters are not regenerated on a regular basis, increases in back pressure will occur, causing numerous problems, as described above.

The concern due to problems associated with increased backpressure also affects the design of emission control device where washcoat loading needs to account for possible effects on backpressure. Increased washcoat loading can affect the flow of exhaust gas through the walls of a filter by providing increased resistance before the exhaust gas reaches the wall. In addition, washcoat may be located in the filter pores, further reducing the flow of exhaust gas. The accumulation of soot within the filter walls between regenerations also has a major effect on increasing backpressure.

A second method aspect of the invention is a method of capturing volatilized platinum (Pt) from an exhaust gas. The method comprises a step of contacting an exhaust gas with a catalytic material comprising platinum (Pt), and then contacting the exhaust gas with a solid foam layer to capture or trap volatilized platinum (Pt).

A second use aspect of the invention relates to the use of a solid foam layer for capturing volatilized platinum (Pt) in an exhaust system for treating an exhaust gas produced by an internal combustion ignition engine. Typically, the exhaust system comprises a catalytic material comprising platinum (Pt), and wherein the solid foam layer is arranged to contact the exhaust gas after the exhaust gas has contacted or passed through the catalytic material comprising platinum (Pt).

When a catalytic material comprising platinum (Pt) is exposed in an exhaust system to relatively high temperatures for a sufficient period of time, low levels of platinum (Pt) may volatility from the catalytic material. This volatilized platinum (Pt) can become trapped on a downstream selective catalytic reduction (SCR) catalyst or a selective catalytic reduction filter (SCRF™) catalyst. Such relatively high temperatures may occur during normal use, especially in heavy duty diesel applications, or during regeneration of a particulate filter. Pt trapped on the SCR catalyst or the SCRF™ catalyst can have a highly detrimental effect on the catalyst's performance because it can oxidize ammonia ($NH_3$). The trapped Pt can consume the $NH_3$ that is intended for the selective catalytic reduction of $NO_x$ (thereby decreasing $NO_x$ conversion) and undesirable, secondary emissions may be produced. The problem of Pt volatilisation is discussed in WO 2013/088133, WO 2013/088132, WO 2013/088128 and WO 2013/050784.

Any reference to a "solid foam layer" in the method or use aspects of the invention above generally refers to a solid foam layer as obtained or obtainable by the method of the invention for coating a substrate with a foam.

In the second method and use aspects of the invention, the exhaust gas may comprise volatilized platinum (Pt) when the catalytic material comprising platinum (Pt) has been exposed to a temperature of ≥700° C.

Generally, volatilized platinum may be present in an exhaust gas (i.e. in an exhaust system) when the temperature of the exhaust gas is ≥700° C., such as ≥800° C., preferably ≥900° C.

BRIEF DESCRIPTION OF THE DRAWINGS

FIG. 5B shows an image of the coating surface and FIGS. 5A and 5C show images in cross-section.

FIG. 7 shows the optical microscope image of the coated filter in EXAMPLE 5a.

FIGS. 9A and 9B show microscope images of a foamed capture region for volatilized Pt dosed onto the DOC formulation of EXAMPLE 7, with the view orientated perpendicular to the substrate channels: FIG. 9A shows a foamed coating; FIG. 9B shows a conventional coating which is not foamed.

FIGS. 10A and 10B show SEM images of slices of the outlet zone of the monoliths shown in FIG. 9, with the view orientated parallel to the substrate channels. FIG. 10A shows a foamed coating; FIG. 10B shows a conventional coating which is not foamed.

DETAILED DESCRIPTION OF THE INVENTION

Figure 1A:
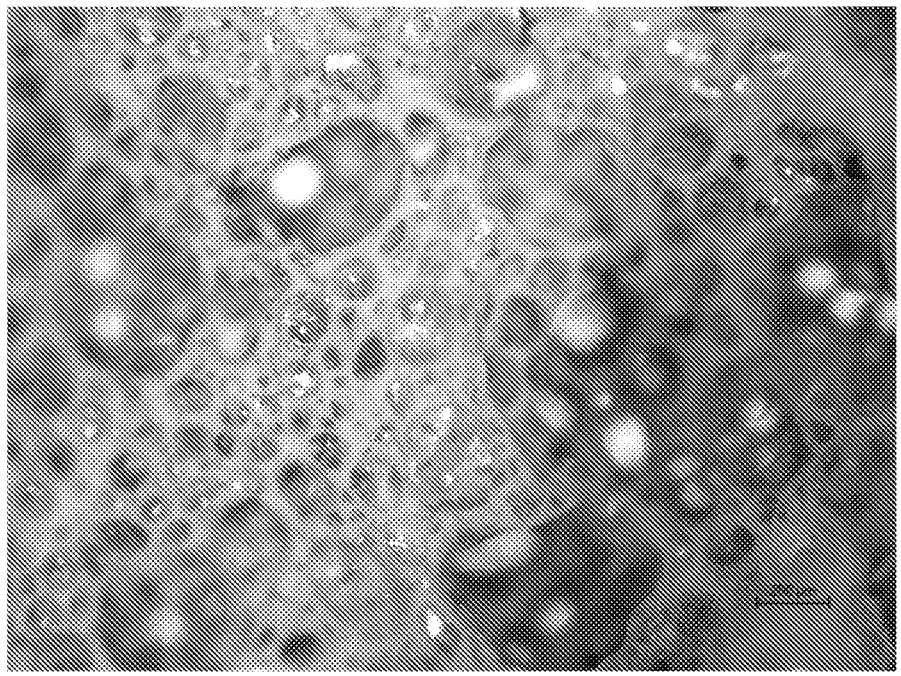
FIG. 1A shows an image from an optical microscope of a fresh foam of sample I in EXAMPLE 2 (at 5× magnification and scale bar 0.20 mm)

The invention provides a method of coating a substrate with a foam. The foam is particle stabilized (referred to herein as a "particle stabilized foam").

The method comprises the step of (a) introducing a foam into a substrate (e.g. a substrate comprising a plurality of channels) through open ends of the channels at a first end of the substrate. This step is a step of applying the foam to the interior of the substrate and onto the walls of the channels. The methods for introducing a liquid into a substrate described in any one of WO 99/47260 A1, WO 2011/080525 A1, WO 2014/195685A1 and WO 2015/145122 (all of which are incorporated herein by reference) can be used to introduce a foam into a substrate. A foam is to be used instead of a liquid (e.g. washcoat) in these methods.

The step of (a) introducing a foam into a substrate through open ends of the channels at a first end of the substrate may comprise the steps of: (i) locating a containment means on top of the first end of the substrate, (ii) dosing the foam, preferably a pre-determined amount of the foam, into the containment means, and (iii) applying [1] a vacuum to open ends of the channels at a second end of the substrate (i.e. to draw the foam into the substrate through the open ends of the channels at the first end) and/or [2] pressure to the open ends of the channels at the first end of the substrate (i.e. to push or blow the foam into the substrate through the open ends of the channels at the first end). The first end of the substrate is an upper end of the substrate, and the second end of the substrate is a lower end of the substrate. When step (a) involves dosing the foam into a containment means on top of the first end of the substrate, then the method may or may not, preferably does not, comprise the additional step of (b) applying (i) a vacuum to open ends of the channels at a second end of the substrate and/or (ii) a pressure to the open ends of the channels at the first end of the substrate.

Alternatively, the step of (a) introducing a foam into a substrate through open ends of the channels at a first end of the substrate may comprise the steps of (i) holding the substrate substantially vertically and (ii) pushing or injecting the foam, preferably a pre-determined amount of the foam, into the substrate (e.g. through the open ends of the channels at the first end). Typically, the first end of the substrate is a lower end of the substrate (and the second end of the substrate is an upper end of the substrate).

In general, it is preferred that the foam is introduced against gravity into the substrate through the open ends of the channels at a lower (i.e. first) end of the substrate, such as by pushing or injecting the foam into the substrate.

The foam may be introduced into the substrate in a step-wise or a continuous manner (e.g. without pausing). It is preferred that the foam is continuously introduced into the substrate, typically until the substrate has been coated with a dose (i.e. a single dose) of the foam.

In general, step (a) comprises introducing the foam in a pre-determined amount.

The term "pre-determined amount" as used herein refers to a total amount of the foam for introduction into the substrate that is sufficient to obtain a specific product characteristic, such as a desired coating specification. The amount is "pre-determined" in the sense that it is determined off-line in routine experiments to find out the total amount of the foam that is needed to achieve the desired product characteristics. Such pre-determined amounts can readily be determined and may be known from using other methods or apparatus for coating substrates in the art (e.g. see WO 99/47260, WO 2011/080525, WO 2014/19568 and WO 2015/145122).

The pre-determined amount may be in the range of 1-300 grams.

The pre-determined amount may be a pre-determined volume and/or a pre-determined mass of the foam. It is preferred that the pre-determined amount is a pre-determined volume. A pre-determined volume may be achieved by use of a pre-determined mass of known density. Typically, the pre-determined volume is based on the volume of the substrate to be coated.

The pre-determined amount may be no more than 500 mL. The pre-determined amount may be 150 mL or less, 100 mL or less, 75 mL or less, or 50 mL or less.

The pre-determined volume may be 1-200% of the volume of the channels to be coated, such as 1-150%, preferably 1-100% (e.g. 1-80%) of the volume of the channels to be coated.

The pre-determined amount is typically a single dose of the foam.

The term "single dose" as used herein refers to an amount of the foam for coating a single substrate, typically to meet a desired product specification.

When step (a) comprises a step of (ii) pushing or injecting the foam into the substrate, then this may be (ii) pushing or injecting the foam, preferably a pre-determined amount of the foam, using a piston. The piston may be located within a housing. It is preferred that the piston is a reciprocating piston within a housing. It is preferred that the housing has a delivery chamber.

It can be difficult to control coating a washcoat to short coat depths on a substrate using common methods because at some point in the process the pre-measured dose of washcoat must spread to cover the facial area of the substrate. This spreading can be over the face of the substrate or over another surface. Thus, the lower the dosed volume, the harder it is to achieve that spreading.

More specifically, it can be difficult with current methods of coating substrates with a washcoat to precisely deliver relatively small amounts of washcoat to a specified coat depth, especially with any precision. This is especially true when a washcoat is being partially applied as a top layer over a bottom layer and the top layer is designed to overlay only a small portion of the bottom layer. This is especially the case when the top layer is designed to be a relatively thin coating over the bottom layer. When a top layer is placed over a bottom layer, the thickness of the top layer may be important and even critical in obtaining the desired conversions in the systems when diffusion of exhaust gas through the top layer is crucial. For example, in an ammonia slip catalyst, a layer comprising an ammonia oxidation catalyst can be placed over or under a layer containing an SCR catalyst. The coat depth of the ammonia oxidation layer can be more precisely controlled using the foam coating described herein.

The emissions control device of the invention and the method for manufacturing therefore can allow for improvements in the sequential passage of gases into and through various zones of an emissions control device containing different catalytic materials, or different amounts of catalytic materials, when catalysts or catalytic materials are present in a sequential or zoned configuration.

The foam may be introduced and coated onto the walls of the channels to provide a pre-determined length of the solid foam layer. The pre-determined length may be from 0.1-100%, such as 0.2-100% (e.g. 1-100%) of the length of the channel. It may be preferable that the pre-determined length is from 0.1-60% (e.g. 0.1-50%) of the channel length, such as from 0.1-20% of the channel length, particularly 0.5 to 15% of the channel length, more preferably 1 to 10% of the channel length. For the avoidance of doubt, the pre-determined length refers to the length of the solid foam layer after drying and/or calcining. It is possible that the length of the particle stabilized foam initially coated onto the substrate may be longer than, shorter than or the same length as the pre-determined length of the solid foam layer.

The pre-determined length may be no more than 100 mm. It may be preferable that the the pre-determined length is no more than 80 mm, no more than 70 mm, no more than 50 mm (e.g. 30 mm or less), no more than 25 mm, no more than 20 mm, no more than 15 mm (e.g. 12 mm or less), no more than 10 mm (e.g. 8 mm or less), or no more than 5 mm. The pre-determined length will depend, and may be limited by, the length of the substrate.

Typically, the foam can be coated onto the walls of the channels to provide a uniform pre-determined length. The expression "uniform predetermined length" refers to a difference between the length of each solid foam layer on the walls of the channels of 20 mm or less, typically 5 mm or less (e.g. 2 mm or less), preferably 1.5 mm or less, more preferably 1 mm or less, especially 0.8 mm or less.

In the method of the invention, the substrate may be a coated substrate or an uncoated substrate (e.g. before the step of (a) introducing a foam into a substrate). When the substrate is a coated substrate, then the foam may be introduced into the coated substrate and onto the coating of the substrate. In general, it is preferred that the substrate is an uncoated substrate (i.e. prior to the introduction of the foam).

The method of the invention may comprise the step of (b) applying (i) a vacuum to open ends of the channels at a second end of the substrate and/or (ii) a pressure to the open ends of the channels at the first end of the substrate.

In a first embodiment, step (b) may comprise applying a vacuum to the open ends of the channels at a second end of the substrate during step (a) or after step (a). It is preferred that the substrate has not been inverted prior to applying the vacuum (i.e. during or after step (a)).

In a second embodiment, step (b) may comprise (i) sealingly retaining the introduced foam within the substrate; (ii) inverting the substrate containing the retained foam; and (iii) applying a vacuum to the open ends of the channels at a second end of the substrate. In the second embodiment, step (b) is performed after step (a). Typically, the first end of the substrate is a lower end of the substrate, and the second end of the substrate is an upper end of the substrate. After inversion, the second end of the substrate will be lower than the first end of the substrate.

In general, the method of the invention may further comprise the step of (c) drying and/or calcining the substrate containing the particle stabilized foam (i.e. to obtain a solid foam layer disposed or supported on the substrate). Step (c) is performed after step (a) or after steps (a) and (b).

The substrate may be dried at 75 to 150° C., such as of 80 to 150° C., preferably 85 to 125° C. (e.g. for 5 to 60 minutes, particularly for 10 to 30 minutes). The drying step may be performed to fix the foam onto the substrate.

The substrate may be calcined at a temperature up to 750° C., such as 150 to 750° C. (e.g. greater than 150° C. and up to 750° C.), such as 300 to 600° C., more preferably 400 to 550° C.

The method of the invention may further comprise a step (d) repeating (a) and (c) or repeating (a), (b) and (c) with a second particle stabilized foam comprising a second particulate material. The second particle stabilized foam may be the same as or different to the first particle stabilized foam. The difference can be based on the composition of the foam, the dosage of the foam, the solid content of the foam, and/or the viscosity of the foam. The coatings may be performed on different locations, using different amounts and/or different coating lengths. For example, the second foam coating or any additional coating thereafter may start from the same or the other open ends of the channels as the previous foam coating.

The method of the invention involves a step of introducing a particle stabilized foam into a substrate. Any reference to a "particle stabilized foam" as used herein generally refers to a wet particle stabilized foam unless indicated to the contrary. The term "particle stabilized foam" is well known in the art and may refer to a Pickering foam. A particle stabilized foam is fundamentally different to a surfactant stabilized foam.

The particle stabilized foam may be obtained from a direct foaming method. The direct foaming method comprises the steps of (i) preparing a suspension of a particulate material in an aqueous medium (e.g. liquid, such as water); and (ii) foaming the suspension, such as by introducing a gas into the suspension to generate a particle-stabilized foam. Heating to remove liquid may produce a solid foam material.

When the particulate material comprises, or consists essentially of, a ceramic material (as defined below), then the method of the invention may further comprise the step of impregnating the solid foam layer with a solution, preferably an aqueous solution, comprising, or consisting essentially of, a catalytically active metal, sorbent or a precursor thereof. This step is preferably performed after (c) drying and/or calcining the substrate containing the particle stabilized foam. The solution typically does not comprise a ceramic material, such as described below.

The method may comprise a further step of drying and/or calcining the substrate after the step of impregnating the solid foam layer with a solution. The precursor of the catalytically active metal (e.g. Pt, Pd, Cu or Fe) or sorbent (e.g. alkaline earth metal, such as Mg, Ba or Sr) will form the catalytically active metal or sorbent typically after calcination.

Typically, the particulate material has a median particle size (e.g. $d_{50}$) of 1 nm to 50 μm (e.g. 20 nm to 50 μm), preferably 2 nm-20 µm (e.g. 20 nm to 20 µm), such as 2 nm-10 µm (e.g. 20 nm to 10 µm), more preferably 2 nm-7 µm (e.g. 20 nm to 7 µm). The $d_{50}$ can be measured by a Malvern Mastersizer 2000 light scattering method.

The particulate material may preferably have a median particle size of 1 µm to 10 µm, preferably 2 µm to 7 µm.

In general, the particulate material has a $d_{90}$ particle size of 1 nm to 50 µm (e.g. 20 nm to 50 µm, preferably 10 µm to 20 µm), preferably 2 nm-18 µm (e.g. 20 nm to 18 µm, preferably 15 µm to 18 µm). The $d_{90}$ particle size is larger than the $d_{50}$ particle size. The do can be measured by a Malvern Mastersizer 2000 light scattering method.

It may be preferable, particularly when the emissions control device comprises a solid foam layer for capturing volatilized platinum (Pt), that the particulate material has a $d_{90}$ particle size of 10 µm to 20 µm, preferably 15 µm to 18 µm.

A suspension of the particulate material, particularly when the particulate material has a larger median particle size, can be milled to attain the desired median particle size. Good foams can be obtained with narrow or broad particle size distributions.

Particulate materials that have been subjected to pre-treatment with a surface modifier may be used, including particulate materials that have been pre-treated with an amphiphile.

In the direct foaming method above, step (i) may comprise preparing a suspension of a particulate material in an aqueous medium (e.g. liquid) containing an amphiphile.

The amphiphile is compound comprising a tail part coupled to a head group. The tail part may generally be described as non-polar and can be aliphatic (linear alkyl or cycloalkyl) or aromatic (phenyl or naphthyl) and can carry one or more substituents. Such substituents may be an alkyl group, e.g. —$C_nH_{2n+1}$ with n<8, an aryl group (such as phenyl or substituted phenyl), —OH, or —$NH_2$. Preferred tail parts are optionally substituted linear carbon chains comprising 2 to 8 carbon atoms. The head group that is coupled to the tail part is preferably an ionic or polar group and may be selected from phosphates, phosphonates, phosphinates, sulphates, sulphonates, carboxylates (i.e. COOH), carboxylate esters, gallate esters, amides, amines including cyclic amines, and —OH.

Examples of suitable amphiphiles include, but are not limited to, carboxylic acids, phenols derivatives, such as alkyl-substituted phenols, ester derivatives of gallic acid (3,4,5-trihydroxybenzoate), catechol derivatives (e.g. alkyl-catechols), amines (e.g. alkyl-substituted amines and catecholamines), and amino acids.

Particularly preferred amphiphiles are $C_2$-$C_6$ carboxylic acids and esters thereof, such as valeric acid, butyric acid and propionic acid, and $C_2$-$C_6$ gallate esters such as propyl gallate. Furthermore, we have found that particularly stable foams may be prepared using amino-acids, especially alpha-amino acids, where the amine group is attached to a carbon atom adjacent the carboxylate head group. Preferred alpha-amino acids include one or more of valine, isoleucine, leucine, phenyl alanine and tryptophan. Methionine may be used where the sulphur content of the resulting foam can be tolerated. Less preferred alpha-amino acids include alanine and tyrosine. Particularly preferred alpha-amino acid amphiphiles include one or more of leucine, isoleucine and phenylalanine. D, L or DL forms of each may be used. An especially suitable amino acid is phenyl alanine. DL-phenyl alanine may be used.

The pH of the suspension may be adjusted before the amphiphile is included, although may not be necessary. For example, the pH may be adjusted to a pH at which the surface charge of the particulate material is high enough for electrostatic stabilization, or at which the amphiphile solubility is increased.

Depending on the charge of the surface to be coated, either a negatively charged or positively charged head group may be chosen. For $Al_2O_3$, a negatively charged head group is suitable at low pH conditions, i.e. pH lower than the isoelectric point, here pH<9, in particular pH 4-5. The above mentioned head groups and further similar groups can be used to modify a broad variety of ceramic particles, in particular metal oxides.

Surface modification can be achieved through the physical or chemical adsorption of negatively or positively charged amphiphile molecules onto a suitable, preferably an oppositely charged surface leaving the hydrophobic tail in contact with the aqueous phase. For positively-charged alumina particles, the adsorption may be carried out with carboxylic acids in water at pH 4.75. By changing the anchoring polar head group of the amphiphile, the alumina surface can also be modified at neutral pH conditions using for instance alkyl gallates as adsorbing molecule. This amphiphile can also be used to lyophobize the surface of a variety of other amphoteric and basic oxides. Alternatively, the surface of acidic-like oxides such as silica, silicon carbide and silicon nitride can be lyophobized employing amine-containing head group amphiphiles.

For the in-situ lyophobization of particles, the amphiphile may be applied in amounts of less than 15% by weight of the particles, preferably in amounts of <5% by weight. The minimum amount of amphiphile that should be present may be about 0.1%, preferably about 1% by weight. Amounts in the range 0.02-2 mmol/g solids of amphiphile may be used. Since the amphiphile, besides of other ingredients of the suspension, also influences the viscosity of the foam, the actual amount of modifier used is chosen dependent on the desired final viscosity.

The particulate material typically acts as a foam stabilizer.

It has been found that particulate materials with different shapes can be used as foam stabilizers, i.e. the ceramic particles may be spherical, polygonal plates, needles, fibres, rods, single crystals etc., provided that their particle size is within suitable dimensions. The particles themselves may be dense, i.e. non-porous, or porous, or mixtures of dense and porous particles may be used.

Typically, the particle stabilized foam contains bubbles having a diameter, preferably a mean diameter, from 1 µm to 1 mm, preferably from 10 µm to 300 µm. The diameter and the mean diameter of the bubbles can be determined by optical microscopy.

After step (c) of the method, some of the bubbles in the particle stabilized foam may collapse or partially collapse.

Typically, after step (c), at least 5%, 10%, 20%, 30%, 40%, or 50% of the bubbles from the particle stabilized foam are collapsed. Additionally or alternatively, after step (c) at least 60%, 70%, 80%, 90%, or 95% of the bubbles from the particle stabilized foam are substantially collapsed.

The density of the foam is typically from 0.1 to 1.2 g/ml.

The foam comprises a particulate material. The particulate material may be a ceramic material, a catalytic material or a sorbent material. The term "sorbent" in this context includes "adsorbent" and "absorbent" mechanisms of storage (e.g. for $NO_x$ or hydrocarbons). The sorbent may, for example, be (i) an alkaline earth metal (e.g. Ca, Mg, Ba, Sr) or an oxide, hydroxide or carbonate thereof or (ii) a hydrocarbon absorbent, such as a zeolite, preferably a non-transition metal exchanged zeolite.

The particle-stabilized foam may be prepared using a suspension of a powder comprising, or consisting essentially of, a ceramic material, a catalytic material, a sorbent material or a precursor therefore. The foam may also be prepared using a metal powder.

The particulate material may be a ceramic material and/or a catalytic material, preferably a catalytic material.

The ceramic material may comprise, or consist essentially of, a refractory oxide, a ceramic compound (e.g. SiC), a metal aluminate, a molecular sieve (e.g. a zeolite) or a mixture of two or more thereof. The ceramic material is typically suitable for use as a support material, such as for a catalytically active metal or a sorbent. The solid foam layer comprising the ceramic material may be treated with a catalytically active metal or sorbent in a subsequent processing step (e.g. by an impregnation step).

The refractory oxide may be selected from the group consisting of alumina, silica, titania, magnesia, zirconia, ceria, lanthana and a mixed or composite oxide of two or more thereof. The refractory oxide may, for example, be selected from the group consisting of alumina, silica, titania, zirconia, ceria, silica-alumina, titania-alumina, zirconia-alumina, ceria-alumina, titania-silica, zirconia-silica, zirconia-titania, ceria-zirconia, ceria-zirconia-alumina and alumina-magnesium oxide.

The catalytic material typically comprises a catalytically active metal supported on a support material. When the support material comprises a molecular sieve, such as a zeolite, then the catalytic active metal may be supported on the molecular sieve or zeolite as a metal-exchanged molecular sieve or zeolite.

In general, the catalytically active metal is at least one transition metal selected from iron, copper, nickel, gold, platinum, palladium, rhodium, and ruthenium.

The support material is typically a refractory oxide, a metal aluminate or a molecular sieve (e.g. zeolite) as defined above. The transition metal and precious metal content in such catalysts may be up to 85% by weight, but is preferably in the range 0.1-35% by weight.

When the particulate material comprises a catalytic material, then preferably the loading of the catalytically active metal, preferably the transition metal, is from 0.1-300 g·ft$^{-3}$, preferably from 0.5-300 g·ft$^{-3}$.

The sorbent material typically comprises a NO$_x$ storage material or a hydrocarbon absorbent. The hydrocarbon absorbent is typically a zeolite, preferably a non-transition metal exchanged zeolite.

In general, the NO$_x$ storage material comprises, or consists essentially of, a NO$_x$ storage component supported on a support material. Typically, the NO$_x$ storage component is an alkali metal (e.g. potassium (K), sodium (Na) or lithium (Li), preferably potassium (K)), an alkaline earth metal (e.g. magnesium (Mg), calcium (Ca), strontium (Sr) or barium (Ba), preferably barium (Ba)), a rare earth metal (e.g. cerium (Ce), lanthanum (La) or yttrium (Y), preferably cerium (Ce)) or an oxide, a carbonate or a hydroxide thereof. The support material may be a refractory oxide as defined above or a metal aluminate.

The ceramic material and/or the catalytic material may be suitable for use in an emissions control device that is a three way catalyst (TWC), a diesel oxidation catalyst (DOC), a NO$_x$ absorber catalyst (NAC), an ammonium slip catalyst (ASC), a selective catalytic reduction (SCR) catalyst, a catalyzed particulate filter (gasoline and diesel) or a SCR catalyst on a filter (SCRF™).

The particle stabilized foam may have a solids content of 1-50%, 2-45%, 3-45%, 3-35%, or 5-30% by weight, more preferably, 10-25% by weight. The solids content of the foam is defined as the weight ratio between the particulate material suspended in the liquid and the total weight of the suspension (liquid+solids) before the foaming process.

After performing step (c) of the method of the invention, a solid foam layer disposed or supported on the substrate is obtained. The invention also relates to an emissions control device comprising a solid foam layer disposed or supported on the substrate. The solid foam layer typically comprises the particulate material. The particulate material may comprise a catalytic material. The solid foam layer is described further below.

The solid foam layer may be directly disposed or supported on the substrate (i.e. the solid foam layer is in direct contact with a surface of the substrate) and/or the solid foam layer may be disposed on a layer, such as a layer obtained from a washcoat.

When the solid foam layer is directly disposed or supported on the substrate, the solid foam layer is substantially localized on the walls of the channels. The expression "substantially localized on the walls of the channels" means that <50%, preferably <75% (e.g. <90%) of the solid foam layer is localized on the walls of the channels, not in the walls of the channels (i.e. within the pores of the channel walls). However, it is recognized that a minor amount of the foam may migrate or diffuse into the walls.

In general, the solid foam layer comprises an open cell structure. The term "open cell structure" as used herein means that a proportion of the cell volume is interconnected. Typically more than 20% of the cell volume, preferably, more than 30%, 40%, or 50% of the cell volume, is interconnected. There may be an open flow-path through the open cell structure of the solid foam layer. In an open cell structure, gas pockets connect to each other.

The solid foam layer may have a median pore diameter of 1-100 μm, preferably 5-80 μm.

The solid foam layer generally comprises bubbles or bubble like structures having a size distribution in the range of 5 μm-500 μm, 50 μm-250 μm, 50 μm-200 μm, or 5 μm-140 μm. The size distribution can be measured using SEM.

The solid foam layer may comprise a partially collapsed structure. At least 5%, 10%, 20%, 30%, 40%, or 50% of the solid foam layer may have a collapsed structure. The solid foam layer may have a substantially collapsed structure. Thus, at least 60%, 70%, 80%, 90%, or 95% of the solid foam layer has a collapsed structure.

Typically, the thickness of the solid foam layer is no more than 500 μm, 400 μm, 350 μm, 300 μm, 200 μm, 160 μm, or 150 μm.

When the solid foam layer comprises a partially collapsed structure, then the thickness of the dense layer (e.g. the collapsed part of the solid foam layer) is between 2 μm-400 μm, 5 μm-300 μm, 10 μm-200 μm, or 20 μm-150 μm.

The emissions control device may have a washcoat loading or an impregnation loading (e.g. of catalytically active material or sorbent) on and/or within the substrate for each layer or for the combination of two or more layers is about 0.1 g/in$^3$ to about 8 g/in$^3$, more preferably about 0.5 g/in$^3$ to about 6 g/in$^3$, and even more preferably about 1 g/in$^3$ to about 4 g/in$^3$.

It may be preferable for the washcoat loading or the impregnation loading on and/or within the substrate for each layer or for the combination of two or more layers to be ≥1.00 g/in$^3$, such as ≥1.2 g/in$^3$, ≥1.5 g/in$^3$, ≥1.7 g/in$^3$ or ≥2.00 g/in$^3$ (e.g. about 1.5 g/in$^3$ to about 2.5 g/in$^3$).

The term "washcoat" is a term widely recognized in the art and refers to mixture of one or more of a ceramic material, a catalytic material or a sorbent material, and optionally other materials such as binders, promoters or stabilizers.

In general, the washcoat loading is about 0.1 to about 5.0 g·in$^{-3}$ (e.g. 0.6-2.5 g·in$^{-3}$ or 0.1 to about 1.0 g·in$^{-3}$, preferably from 0.1-0.6 g·in$^{-3}$).

Typically, the washcoat comprises a loading of catalytically active metal or NO$_x$ storage component of from 0.1-300 g·ft$^{-3}$. In another further embodiment, the catalytically active metal or NO$_x$ storage component has a loading is from 0.5-300 g·ft$^{-3}$. The catalytically active metal is typically a platinum group metal (PGM), such platinum, palladium and/or rhodium.

Substrates for use in the method of the invention and for emissions control devices are well known in the art.

In general, it is preferred that the substrate is a honeycomb monolith substrate. The term "honeycomb monolith substrate" as used herein refers to a substrate having a plurality of channels that extend longitudinally along the length of the substrate, wherein each channel has at least one open end (i.e. for exhaust gas to flow through). Typically, the channels are formed between a plurality of walls. The channels may have an irregular cross-section and/or a regular cross-section. When the channels have a regular cross-section, then the cross-section is not limited to a hexagonal cross-section and can, for example, be rectangular or square.

The honeycomb monolith substrate may be a flow-through honeycomb monolith substrate. Thus, the honeycomb monolith substrate may comprise a plurality of channels, typically extending therethrough, wherein each channel is open at both ends (i.e. an open end at the inlet and an open end at the outlet). In general, a flow-through honeycomb monolith substrate is different to a partial filter honeycomb monolith substrate. A flow-through honeycomb monolith substrate typically does not comprise a collecting element, such as a plurality of deflections in the plurality of the walls.

The honeycomb monolith substrate may be a filtering honeycomb monolith substrate, such as a wall-flow honeycomb monolith substrate. Such filtering honeycomb monolith substrates are able to trap or remove particulate matter (PM), such as soot particles, in an exhaust gas produced by an internal combustion engine, particularly a compression ignition engine (e.g. a diesel engine).

In a wall-flow honeycomb monolith substrate, the honeycomb monolith substrate may comprise a plurality of channels, wherein each channel has an open end and a closed end (e.g. blocked end). Each channel is typically separated from a neighbouring channel by a porous structure (e.g. a porous wall). Generally, each channel having an open end at a first end of the substrate and a closed (e.g. blocked) end at a second (i.e. opposite) end of the substrate is typically adjacent to a channel having a closed (e.g. blocked) end at the first end of the substrate and an open end at the second (i.e. opposite) end of the substrate. When the first end of the substrate is arranged to be an upstream end, then (i) each channel having an open end at the first end of the substrate and a closed end at the second end of the substrate is an inlet channel, and (ii) each channel having an closed end at the first end of the substrate and an open end at the second end of the substrate is an outlet channel. It is preferred that each inlet channel is alternately separated from an outlet channel by the porous structure (e.g. a porous wall) and vice versa. Thus, an outlet channel is vertically and laterally adjacent to an inlet channel and vice-versa. Fluid communication between the inlet channels and the outlet channels is via the porous structure (e.g. porous wall) of the substrate. When viewed from either end, the alternately closed (e.g. blocked) and open ends of the channels take on the appearance of a chessboard.

The substrate may be a partial filter substrate (see, for example, the partial filter substrates disclosed in WO01/80978 or EP1057519). Typically, a partial filter substrate has a collecting element (e.g. for particulate matter, such as soot particles) and a plurality of channels (i.e. for exhaust gas to flow through), wherein each channel has at least one open end (preferably each channel has two open ends (i.e. each channel has both ends open)). In general, the partial filter substrate has a plurality of walls that define the boundaries of the channels. Typically, the collecting element is a plurality of deflections in the plurality of the walls. Each wall may have no deflections or one or more deflections. Each deflection acts as an obstruction to any particulate matter in the exhaust gas that flows through the substrate. Each deflection may have a flap or a wing-like shape and, typically, each deflection projects outwards from (e.g. at an angle to) the plane of the wall. It is preferred that each deflection is combined with an opening in a wall of the substrate. Each opening in a wall allows the exhaust gas to flow from one channel to a neighbouring channel.

Generally, the substrate is a ceramic material or a metallic material. When the substrate is a ceramic material, then typically the ceramic material may be selected from the group consisting of silicon carbide (SiC), aluminium nitride, silicon nitride, aluminium titanate, alumina, cordierite (SiO$_2$—AL$_2$O$_3$—MgO), mullite, pollucite and a thermet (e.g. Al$_2$O$_3$/Fe, Al$_2$O$_3$/Ni or B$_4$C/Fe, or composites comprising segments of any two or more thereof). When the substrate is a metallic material, then typically the metallic material is selected from the group consisting of Fe—Cr—Al alloy, Ni—Cr—Al alloy and a stainless steel alloy.

The inventors have developed two advantageous embodiments of the emissions control device of the invention comprising a solid foam layer.

In a first emissions control device embodiment, the emissions control device is an SCR catalyst. The solid foam layer comprises a particulate material, which is a metal oxide based SCR catalyst formulation, a molecular sieve based SCR catalyst formulation or mixture thereof. Such SCR catalyst formulations are known in the art.

The metal oxide based SCR catalyst formulation typically comprises vanadium or tungsten or a mixture thereof supported on a refractory oxide. The refractory oxide may be selected from the group consisting of alumina, silica, titania, zirconia, ceria and combinations thereof.

It may be preferable that the metal oxide based SCR catalyst formulation comprises, or consists essentially of, an oxide of vanadium (e.g. V$_2$O$_5$) and/or an oxide of tungsten (e.g. WO$_3$) supported on a refractory oxide selected from the group consisting of titania (e.g. TiO$_2$), ceria (e.g. CeO$_2$), and a mixed or composite oxide of cerium and zirconium (e.g. Ce$_x$Zr$_{(1-x)}$O$_2$, wherein x=0.1 to 0.9, preferably x=0.2 to 0.5).

When the refractory oxide is titania (e.g. TiO$_2$), then preferably the concentration of the oxide of vanadium is from 0.5 to 6 wt. % (e.g. of the metal oxide based SCR formulation) and/or the concentration of the oxide of tungsten (e.g. WO$_3$) is from 5 to 20 wt. %. More preferably, the oxide of vanadium (e.g. V$_2$O$_5$) and the oxide of tungsten (e.g. WO$_3$) are supported on titania (e.g. TiO$_2$).

When the refractory oxide is ceria (e.g. CeO$_2$), then preferably the concentration of the oxide of vanadium is from 0.1 to 9 wt. % (e.g. of the metal oxide based SCR formulation) and/or the concentration of the oxide of tungsten (e.g. $WO_3$) is from 0.1 to 9 wt. %.

In general, it is preferred that the metal oxide based SCR catalyst formulation comprises, or consists essentially of, an oxide of vanadium (e.g. $V_2O_5$) and optionally an oxide of tungsten (e.g. $WO_3$), supported on titania (e.g. $TiO_2$).

The first selective catalytic reduction composition may comprise, or consist essentially of, a molecular sieve based SCR catalyst formulation. The molecular sieve based SCR catalyst formulation comprises a molecular sieve, which is optionally a transition metal exchanged molecular sieve. It is preferable that the SCR catalyst formulation comprises a transition metal exchanged molecular sieve.

In general, the molecular sieve based SCR catalyst formulation may comprise a molecular sieve having an aluminosilicate framework (e.g. zeolite), an aluminophosphate framework (e.g. AlPO), a silicoaluminophosphate framework (e.g. SAPO), a heteroatom-containing aluminosilicate framework, a heteroatom-containing aluminophosphate framework (e.g. MeAlPO, where Me is a metal), or a heteroatom-containing silicoaluminophosphate framework (e.g. MeAPSO, where Me is a metal). The heteroatom (i.e. in a heteroatom-containing framework) may be selected from the group consisting of boron (B), gallium (Ga), titanium (Ti), zirconium (Zr), zinc (Zn), iron (Fe), vanadium (V) and combinations of any two or more thereof. It is preferred that the heteroatom is a metal (e.g. each of the above heteroatom-containing frameworks may be a metal-containing framework).

It is preferable that the molecular sieve based SCR catalyst formulation comprises, or consist essentially of, a molecular sieve having an aluminosilicate framework (e.g. zeolite) or a silicoaluminophosphate framework (e.g. SAPO). More preferably, the molecular sieve has an aluminosilicate framework (e.g. zeolite).

When the molecular sieve has an aluminosilicate framework (e.g. the molecular sieve is a zeolite), then typically the molecular sieve has a silica to alumina molar ratio (SAR) of from 5 to 200 (e.g. 10 to 200), preferably 10 to 100 (e.g. 10 to 30 or 20 to 80), such as 12 to 40, more preferably 15 to 30.

Typically, the molecular sieve is microporous. A microporous molecular sieve has pores with a diameter of less than 2 nm (e.g. in accordance with the IUPAC definition of "microporous" [see *Pure & Appl. Chem.*, 66(8), (1994), 1739-1758)]).

The molecular sieve based SCR catalyst formulation may comprise a small pore molecular sieve (e.g. a molecular sieve having a maximum ring size of eight tetrahedral atoms), a medium pore molecular sieve (e.g. a molecular sieve having a maximum ring size of ten tetrahedral atoms) or a large pore molecular sieve (e.g. a molecular sieve having a maximum ring size of twelve tetrahedral atoms) or a combination of two or more thereof.

When the molecular sieve is a small pore molecular sieve, then the small pore molecular sieve may have a framework structure represented by a Framework Type Code (FTC) selected from the group consisting of ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, LEV, KFI, MER, MON, NSI, OWE, PAU, PHI, RHO, RTH, SAT, SAV, SIV, THO, TSC, UEI, UFI, VNI, YUG and ZON, or a mixture and/or an intergrowth of two or more thereof. Preferably, the small pore molecular sieve has a framework structure represented by a FTC selected from the group consisting of CHA, LEV, AEI, AFX, ERI, SFW, KFI, DDR and ITE. More preferably, the small pore molecular sieve has a framework structure represented by a FTC selected from the group consisting of CHA and AEI. The small pore molecular sieve may have a framework structure represented by the FTC CHA. The small pore molecular sieve may have a framework structure represented by the FTC AEI. When the small pore molecular sieve is a zeolite and has a framework represented by the FTC CHA, then the zeolite may be chabazite.

When the molecular sieve is a medium pore molecular sieve, then the medium pore molecular sieve may have a framework structure represented by a Framework Type Code (FTC) selected from the group consisting of AEL, AFO, AHT, BOF, BOZ, CGF, CGS, CHI, DAC, EUO, FER, HEU, IMF, ITH, ITR, JRY, JSR, JST, LAU, LOV, MEL, MFI, MFS, MRE, MTT, MVY, MWW, NAB, NAT, NES, OBW, —PAR, PCR, PON, PUN, RRO, RSN, SFF, SFG, STF, STI, STT, STW, —SVR, SZR, TER, TON, TUN, UOS, VSV, WEI and WEN, or a mixture and/or an intergrowth of two or more thereof. Preferably, the medium pore molecular sieve has a framework structure represented by a FTC selected from the group consisting of FER, MEL, MFI and STT. More preferably, the medium pore molecular sieve has a framework structure represented by a FTC selected from the group consisting of FER and MFI. When the medium pore molecular sieve is a zeolite and has a framework represented by the FTC FER or MFI, then the zeolite may be ferrierite, silicalite or ZSM-5.

When the molecular sieve is a large pore molecular sieve, then the large pore molecular sieve may have a framework structure represented by a Framework Type Code (FTC) selected from the group consisting of AFI, AFR, AFS, AFY, ASV, ATO, ATS, BEA, BEC, BOG, BPH, BSV, CAN, CON, CZP, DFO, EMT, EON, EZT, FAU, GME, GON, IFR, ISV, ITG, IWR, IWS, IWV, IWW, JSR, LTF, LTL, MAZ, MEI, MOR, MOZ, MSE, MTW, NPO, OFF, OKO, OSI, —RON, RWY, SAF, SAO, SBE, SBS, SBT, SEW, SFE, SFO, SFS, SFV, SOF, SOS, STO, SSF, SSY, USI, UWY and VET, or a mixture and/or an intergrowth of two or more thereof. Preferably, the large pore molecular sieve has a framework structure represented by a FTC selected from the group consisting of AFI, BEA, MAZ, MOR and OFF. More preferably, the large pore molecular sieve has a framework structure represented by a FTC selected from the group consisting of BEA, MOR and MFI. When the large pore molecular sieve is a zeolite and has a framework represented by the FTC BEA, FAU or MOR, then the zeolite may be a beta zeolite, faujasite, zeolite Y, zeolite X or mordenite.

In general, it is preferred that the molecular sieve is small pore molecular sieve.

The molecular sieve based SCR catalyst formulation preferably comprises a transition metal exchanged molecular sieve. The transition metal may be selected from the group consisting of cobalt, copper, iron, manganese, nickel, palladium, platinum, ruthenium and rhenium. It is preferred that the transition metal is selected from the group consisting of copper and iron.

The transition metal may be iron. An advantage of SCR catalyst formulations containing an iron exchanged molecular sieve is that such formulations have excellent $NO_x$ reduction activity at a higher temperature than, for example, a copper exchanged molecular sieve. An iron exchanged molecular sieve may also generate a minimal amount of $N_2O$ (compared to other types of SCR catalyst formulation).

The transition metal may be copper. An advantage of SCR catalyst formulations containing a copper exchanged molecular sieve is that such formulations have excellent low temperature $NO_x$ reduction activity (e.g. it may be superior to the low temperature $NO_x$ reduction activity of an iron exchanged molecular sieve).

The transition metal may be present on an extra-framework site on the external surface of the molecular sieve or within a channel, cavity or cage of the molecular sieve.

As described above, increasing loadings of catalytic material can bring an undesirable increase in filter backpressure. For example, selective catalytic reduction (SCR) catalysts may include $V_2O_5/WO_3/TiO_2$ and transition metal-exchanged zeolites such as Fe/Beta zeolite or Cu/CHA. A particular difficulty with making such products is balancing the competing requirements of retaining catalyst activity at an acceptable backpressure. While it is possible to counteract some of the attendant difficulties with use of higher porosity filter substrates, such substrates are more fragile and more difficult to handle. An alternative means of avoiding unacceptable backpressure is to limit the amount of catalytic material. However, decreasing the amount of SCR catalyst results in lower $NO_x$ conversion and $NH_3$ storage capacity, which is important for lower temperature $NO_x$ conversion.

Furthermore, quite complicated multiple layered catalyst arrangements such as DOCs and NACs can be coated on a flow-through substrate monolith. Although it is possible to coat a surface of a filter monolith, e.g. an inlet channel surface of a wall-flow filter, with more than one layer of catalyst composition, an issue with coating filtering monoliths is to avoid unnecessarily increasing backpressure, when in use, by overloading the filter monolith with catalyst washcoat, thereby restricting the passage of gas therethrough. Hence, although coating a surface of a filter substrate monolith sequentially with one or more different catalyst layers is not impossible, it is more common for different catalyst compositions to be segregated either in zones, e.g. axially segregated front and rear half zones of a filter monolith, or else by coating an inlet channel of a wall-flow filter substrate monolith with a first catalyst composition and an outlet channel thereof with a second catalyst composition.

It has been found that coating the substrate with a particle stabilized foam can reduce the backpressure normally associated with the same substrate coated using a washcoat having a similar composition. The foam coating described herein allows for the formation of a permeable washcoat layer and minimizes the backpressure impact of increasing the washcoat loading, thereby allowing more catalyst coating at an acceptable backpressure. This foam layer also prevents soot from entering the wall of the filter or other substrates and minimizes the impact of soot on backpressure.

When the emissions control device is an SCR catalyst, then the substrate is typically a honeycomb monolith substrate, which is preferably a flow-through honeycomb monolith substrate or a wall-flow honeycomb monolith substrate, more preferably a wall-flow honeycomb monolith substrate.

The substrate can be a cordierite flow-through monolith, a metallic flow-through monolith, a cordierite particulate filter, a silicon carbide particulate filter or an aluminium titanate particulate filter.

When the substrate is a wall-flow honeycomb monolith substrate, such as a particulate filter, then typically the substrate has a porosity of 40 to 70%, preferably 45 to 65%, such as 50 to 65% (e.g. 55 to 65%). Additionally or alternatively, the substrate may have a mean pore size of 8 to 45 µm, preferably 10 to 30 µm (e.g. 10 to 25 µm), particularly 15 to 25 µm. Mean pore size can be determined by mercury porosimetry.

In a second emissions control device embodiment, the emissions control device comprises a substrate and a solid foam layer for capturing volatilized platinum (Pt). The solid foam layer preferably has an open cell structure.

The solid foam layer for capturing volatilized platinum (Pt) comprises, or consists essentially of, a capture material. The particulate material is typically the capture material. Suitable capture materials are described in WO 2013/088133, WO 2013/088132, WO 2013/088128, WO 2013/050784 and WO 2016/128720 (all of which are incorporated herein by reference).

The capture material comprises or consists essentially of:
(a) particles of a refractory oxide, preferably particles of a refractory oxide having a mean specific surface area≤about 50 m$^2$/g, and/or
(b) particles of a Pt-alloying metal, preferably particles of a Pt-alloying metal having a mean particle size≥about 10 nm and/or a dispersion of≤about 10%.

Typically, the solid foam layer for capturing volatilized platinum (Pt) or the capture material thereof comprises a loading of the particles of the refractory oxide of 0.1 to 3.5 g in$^{-3}$, preferably 0.2 to 2.5 g in$^{-3}$, still more preferably 0.3 to 2.0 g in$^{-3}$, and even more preferably 0.5 to 1.75 g in$^{-3}$ (e.g. 0.75 to 1.5 g in$^{-3}$).

The capture material may comprise, or consist essentially of, particles of a refractory oxide having a mean specific surface area≤about 50 m$^2$/g (<about 50 m$^2$/g), such as≤about 40 m$^2$/g (<about 40 m$^2$/g), preferably≤about 30 m$^2$/g (<about 30 m$^2$/g), more preferably≤about 20 m$^2$/g (<about 20 m$^2$/g), even more preferably≤about 10 m$^2$/g (<about 10 m$^2$/g). The mean specific surface area (SSA) of the particles of the refractory oxide can be determined by nitrogen physisorption at −196° C. using the volumetric method. The mean SSA is determined using the BET adsorption isotherm equation.

The refractory oxide may have a $d_{90}$ of <100 micron. The refractory oxide may preferably have a $d_{90}$ of <75 micron, such as <50 micron (e.g. <30 micron), and more preferably <20 micron.

Typically, the refractory oxide has a $d_{90}$ of >0.1 micron. It is preferred that the refractory oxide has a $d_{90}$ of >1.0 micron, such as >5.0 micron.

The particles of a refractory oxide for use in accordance with the second emissions control device embodiment of the invention have a relatively low mean specific surface area compared to the mean specific surface area of particles of the same refractory oxide that are used as a support material (e.g. for a catalytically active metal, such as a platinum group metal) in prior art emissions control devices (e.g. DOC, CSF or NSC). In general, small refractory oxide particles having a large mean specific surface area are used to maximize catalytic activity. In contrast, the particles of the refractory oxide for use in accordance with the invention are relatively large (i.e. generally much larger than when used as a support material in prior art emissions control devices).

Refractory oxides having a mean specific surface area≤about 50 m$^2$/g are known in the art and may be commercially available.

The refractory oxide may be selected from the group consisting of alumina, silica, titania, zirconia, ceria and a mixed or composite oxide thereof, such as a mixed or composite oxide of two or more thereof. For example, the refractory oxide may be selected from the group consisting of alumina, silica, titania, zirconia, ceria, silica-alumina, titania-alumina, zirconia-alumina, ceria-alumina, titania-silica, zirconia-silica, zirconia-titania, ceria-zirconia and alumina-magnesium oxide.

It is preferred that the refractory oxide is selected from the group consisting of alumina, silica, ceria, silica-alumina, ceria-alumina, ceria-zirconia and alumina-magnesium oxide. More preferably, the refractory oxide is selected from the group consisting of alumina, ceria, silica-alumina and ceria-zirconia. The refractory oxide may be alumina or silica-alumina.

It may be preferable that the capture material does not comprise a Pt-alloying material (PAM), particularly when the Pt-alloying material comprises palladium. This embodiment is referred to herein as the "PAM free embodiment". More preferably, the capture material does not comprise palladium and platinum. It is further preferred that the capture material does not comprise one or more platinum group metals (PGM) and/or one or more coinage metals gold (Au) and/or silver (Ag). Even more preferably, the capture material does not comprise one or more transition metals (i.e. except for any transition metals that may be part of the refractory oxide, such as zirconia). In such circumstances, the particles of a refractory oxide having a mean specific surface area ≤50 m$^2$/g may be used primarily or solely as the capture material.

In the PAM free embodiment, the refractory oxide is preferably ceria, ceria-alumina or ceria-zirconia. More preferably the refractory oxide comprises, or consists essentially, of ceria. Even more preferably, the refractory oxide consists essentially of ceria.

Additionally or alternatively, the capture material may comprise, or consist essentially of, particles of a Pt-alloying material (PAM), such as palladium (Pd). Embodiments of the invention where the Pt-alloying material is included in the capture material are referred to herein as a "PAM containing embodiment".

The inclusion of a Pt-alloying material (PAM) in the capture material has been found to be advantageous because it can readily form an alloy with volatilized Pt. The formation of an alloy between Pt and the Pt-alloying material (e.g. Pt—Pd alloy) in the capture material effectively traps the volatilized Pt because of the stability of the alloy.

Typically, the Pt-alloying material comprises, or consists essentially of, a metal and/or an oxide thereof. The metal is preferably selected from the group consisting of palladium (Pd); gold (Au); copper (Cu); a mixture of Pd and Au; a mixture of Pd and Cu; a mixture of Au and Cu; a mixture of Pd, Au and Cu; a bimetallic alloy of Pd and Au; a bimetallic alloy of Pd and Cu; a bimetallic alloy of Au and Cu; and a trimetallic alloy of Pd, Au and Cu. It is preferred that the metal is selected from the group consisting of palladium (Pd), a mixture of Pd and Au, and a bimetallic alloy of Pd and Au. More preferably, the metal is palladium (Pd).

For the avoidance of doubt, the Pt-alloying material does not comprise platinum (e.g. when new or unused).

It is preferred that the particles of the Pt-alloying material have a mean particle size≥about 10 nm, such as a mean particle size>about 10 nm. More preferably, the particles of the Pt-alloying material have a mean particle size≥about 15 nm, such as≥about 20 nm, still more preferably≥about 50 nm, such as≥about 75 nm.

Generally, a metal that can act as a Pt-alloying material is included in an oxidation catalyst for its catalytic activity. The mean particle size of such metals (e.g. palladium) in conventional emissions control devices is much smaller than 10 nm. The particles of the Pt-alloying material for use in the capture material in accordance with the invention are relatively large. It has surprisingly been found that such large particles of the Pt-alloying material are able to trap or capture volatilized Pt whilst being relatively catalytically inactive.

Typically the Pt-alloying material has a mean particle size of from 10 nm to 1000 micron. It is preferred that the Pt-alloying material has a mean particle size of from 15 nm to 100 micron, more preferably 20 nm to 20 micron, particularly 50 nm to 5 micron, such as 75 nm to 3 micron.

The particles of the Pt-alloying material particles typically have a dispersion of≤about 10% (e.g. <about 10%), preferably≤about 7.5%, such as≤about 5%, more preferably-≤about 2.5%. The measurement of the dispersion refers to unused Pt-alloying material particles (i.e. fresh particles, which have not been subjected to repeated or prolonged use).

The "mean particle size" and the "dispersion" as used herein with reference to the Pt-alloying material can be determined using conventional methods and as described in WO 2016/128720.

Generally, the capture material has a total loading of Pt-alloying material (e.g. the metal content of the Pt-alloying material) of 1 g ft$^{-3}$ to 50 g ft$^{-3}$, preferably 4 g ft$^{-3}$ to 40 g ft$^{-3}$, even more preferably 8 g ft$^{-3}$ to 30 g ft$^{-3}$.

The Pt-alloying material, such as palladium, may be disposed or supported on a substrate (e.g. the Pt-alloying material is directly coated onto the substrate).

It is preferred that the Pt-alloying material is disposed or supported on a support material (e.g. a particulate support material). The Pt-alloying material may be disposed directly onto or is directly supported by the support material (e.g. there is no intervening support material between the Pt-alloying material and the support material). For example, the Pt-alloying material, such as palladium, can be dispersed on a surface of and/or impregnated into the support material.

Generally, the support material comprises, or consists essentially of, a refractory oxide, such as a refractory oxide as defined above. It is preferred that the refractory oxide is selected from the group consisting of alumina, silica, ceria, silica-alumina, ceria-alumina, ceria-zirconia and alumina-magnesium oxide. More preferably, the refractory oxide is selected from the group consisting of alumina, ceria, silica-alumina and ceria-zirconia. Even more preferably, the refractory oxide is alumina or silica-alumina, particularly silica-alumina.

The refractory oxide may be of the type defined above that has a relatively low mean specific surface area and has particles that are relatively large.

The invention includes various arrangements of the capture material in relation to a catalytic material comprising (Pt).

A first arrangement relates to an emissions control device comprising the solid foam layer for capturing volatilized platinum (Pt), which emissions control device may further comprise a catalytic material, wherein the catalytic material comprises platinum (Pt). The solid foam layer is typically arranged to contact the exhaust gas after the exhaust gas has contacted or passed through the catalytic material comprising platinum (Pt).

A second arrangement relates to an exhaust system comprising a first emissions control device upstream of, preferably directly upstream of, a second emissions control device (i.e. the outlet of the first emissions control device is coupled, preferably directly coupled, to the inlet of the second emissions control device). The first emissions control device comprises a catalytic material disposed or supported on a substrate. The second emissions control device comprises the solid foam layer for capturing volatilized platinum (Pt) disposed or supported on a substrate.

For the avoidance of doubt, the capture material and the catalytic material have different compositions.

Generally, the catalytic material comprises platinum (Pt) disposed or supported on a support material. (referred to herein as the support material of the catalytic material or "CM support material"). The CM support material comprises, or consists essentially of, a refractory oxide (referred to herein as the refractory oxide of the catalytic material). Particles of the refractory oxide typically have a mean specific surface area ≥75 $m^2/g$, such as ≥100 $m^2/g$, and preferably ≥100 $m^2/g$.

The refractory oxide of the CM support material is typically selected from the group consisting of alumina, silica, titania, zirconia, ceria and a mixed or composite oxide thereof, such as a mixed or composite oxide of two or more thereof. For example, the refractory oxide may be selected from the group consisting of alumina, silica, titania, zirconia, ceria, silica-alumina, titania-alumina, zirconia-alumina, ceria-alumina, titania-silica, zirconia-silica, zirconia-titania, ceria-zirconia and alumina-magnesium oxide.

The catalytic material may comprise a single platinum group metal (PGM), which is platinum (e.g. the catalytic material comprises platinum as the only platinum group metal).

Alternatively, the catalytic material may comprise (i) platinum (Pt), and (ii) palladium (Pd) and/or rhodium (Rh).

If the catalytic material comprises palladium (Pd), then typically the catalytic material comprises particles of palladium (Pd) having a mean particle size <10 nm, preferably ≤8 nm.

If the catalytic material comprises palladium (Pd), then typically the catalytic material comprises particles of palladium (Pd) having a dispersion >10%, preferably ≥15% (e.g. 15 to 35%), such as ≥20% (e.g. 20 to 30%).

In general, when the catalytic region or the catalytic material thereof comprises Pt and Pd (and optionally Rh), then typically the ratio by mass of Pt to Pd is ≥1:1. The catalytic material may comprise Pt and optionally Pd, such that the ratio by mass of Pt to Pd is from 1:0 to 1:1. It is preferred that when the catalytic material comprises Pt and Pd (and optionally Rh), then the ratio by mass of Pt to Pd is ≥1.5:1, more preferably ≥2:1 (e.g. ≥3:1), even more preferably ≥4:1, such as ≥10:1. The ratio by mass (i.e. mass ratio) of Pt to Pd is preferably 50:1 to 1:1, more preferably 30:1 to 2:1 (e.g. 25:1 to 4:1), even more preferably 20:1 to 5:1, such as 15:1 to 7.5:1.

Generally, when the catalytic material comprises Pt and Rh (and optionally Pd), then typically the ratio by mass of Pt to Rh is ≥1:1. The catalytic material may comprise Pt and optionally Rh, such that the ratio by mass of Pt to Rh is from 1:0 to 1:1. When the catalytic material comprises Pt and Rh (and optionally Pd), then preferably the ratio by mass of Pt to Rh is ≥1.5:1, more preferably ≥2:1 (e.g. ≥3:1), even more preferably ≥4:1, such as ≥10:1. The ratio by mass (i.e. mass ratio) of Pt to Rh is preferably 50:1 to 1:1, more preferably 30:1 to 2:1 (e.g. 25:1 to 4:1), even more preferably 20:1 to 5:1, such as 15:1 to 7.5:1.

In the first arrangement, the solid foam layer for capturing volatilized platinum (Pt) comprises, or consists essentially of, a capture material may be:
(a) disposed or supported on the catalytic material; and/or
(b) disposed directly on the substrate [i.e. the capture material is in contact with a surface of the substrate]; and/or
(c) in contact with the catalytic material [i.e. the capture material is adjacent to, or abuts, the catalytic material].

The solid foam layer for capturing volatilized platinum (Pt) is arranged to contact the exhaust gas after the exhaust gas has contacted and/or passed through the catalytic material.

Generally, the solid foam layer region is arranged to contact the exhaust gas as it leaves the emissions control device. The catalytic material may be arranged or oriented to contact exhaust gas before the solid foam layer.

It is preferred that the solid foam layer is disposed or supported at or near an outlet end of the substrate.

The catalytic material may be disposed or supported upstream of the solid foam layer. Additionally or alternatively, the solid foam layer may overlap the catalytic material. An end portion or part of the solid foam layer may be disposed or supported on the catalytic material. The solid foam layer may completely or partly overlap the catalytic material.

In general, the loading of the solid foam layer is from 0.1-4.0 $g \cdot in^{-3}$, preferably from 0.5-2.0 $g \cdot in^{-3}$.

In a third emissions control device embodiment, the emissions control device comprises a substrate and a solid foam layer for oxidizing soot (and optionally carbon monoxide and hydrocarbons). The emissions control device is a catalyzed soot filter (CSF).

The solid foam layer preferably has an open cell structure.

The substrate is preferably a filtering substrate, such as a wall-flow honeycomb monolith substrate (e.g. a particulate filter).

The solid foam layer for oxidizing soot may be disposed or supported on the inlet channels and/or the outlet channels of the filtering substrate. It is preferred that the solid foam layer is disposed or supported on at least the inlet channels of the filtering substrate.

The solid foam layer for oxidizing soot comprises, or consists essentially of, a catalytic material, such as described above.

Typically, the catalytic material for oxidizing soot comprises, or consists essentially of a platinum group metal disposed on a support material.

The platinum group metal is preferably platinum and/or palladium.

The support material comprises, or consists essentially of, a refractory oxide. The refractory oxide may be selected from the group consisting of alumina, silica, titania, zirconia, ceria and a mixed or composite oxide thereof, such as a mixed or composite oxide of two or more thereof. For example, the refractory oxide may be selected from the group consisting of alumina, silica, titania, zirconia, ceria, silica-alumina, titania-alumina, zirconia-alumina, ceria-alumina, titania-silica, zirconia-silica, zirconia-titania, ceria-zirconia and alumina-magnesium oxide.

It is preferred that the refractory oxide is selected from the group consisting of alumina, silica, ceria, silica-alumina, ceria-alumina, ceria-zirconia and alumina-magnesium oxide. More preferably, the refractory oxide is selected from the group consisting of alumina, ceria, silica-alumina and ceria-zirconia. The refractory oxide may be alumina or silica-alumina.

In a fourth emissions control device embodiment, the emissions control device comprises a substrate and a solid foam layer for oxidizing particulates (and optionally (i) oxidizing carbon monoxide and hydrocarbons, and (ii) reducing oxides of nitrogen ($NO_x$)). The emissions control device is a gasoline particulate filter (GPF).

The solid foam layer preferably has an open cell structure.

The substrate is typically a filtering substrate, such as a wall-flow honeycomb monolith substrate (e.g. a particulate filter). The substrate can be a cordierite flow-through monolith, a metallic flow-through monolith, a cordierite particulate filter, a silicon carbide particulate filter or an aluminium titanate particulate filter.

When the substrate is a wall-flow honeycomb monolith substrate, such as a particulate filter, then typically the substrate has a porosity of 40 to 70%, preferably 45 to 65%, such as 50 to 65% (e.g. 55 to 65%). Additionally or alternatively, the substrate may have a mean pore size of 8 to 45 µm, preferably 10 to 30 µm (e.g. 10 to 25 µm), particularly 15 to 25 µm. Mean pore size can be determined by mercury porosimetry.

In the fourth emissions control device embodiment, the solid foam layer may be disposed or supported on the inlet channels and/or the outlet channels of the filtering substrate. It is preferred that the solid foam layer is disposed or supported on at least the inlet channels of the filtering substrate.

The solid foam layer for oxidizing soot comprises, or consists essentially of, a catalytic material, such as described above.

Typically, the catalytic material comprises, or consists essentially of a platinum group metal, a support material and a oxygen storage component.

The platinum group metal is preferably rhodium and/or palladium.

The support material comprises, or consists essentially of, a refractory oxide. The refractory oxide may be selected from the group consisting of alumina, silica, titania, zirconia, ceria and a mixed or composite oxide thereof, such as a mixed or composite oxide of two or more thereof. For example, the refractory oxide may be selected from the group consisting of alumina, silica, titania, zirconia, ceria, silica-alumina, titania-alumina, zirconia-alumina, ceria-alumina, titania-silica, zirconia-silica, zirconia-titania, ceria-zirconia and alumina-magnesium oxide.

It is preferred that the refractory oxide is selected from the group consisting of alumina, silica, ceria, silica-alumina, ceria-alumina, ceria-zirconia and alumina-magnesium oxide. More preferably, the refractory oxide is selected from the group consisting of alumina, ceria, silica-alumina and ceria-zirconia. The refractory oxide may be alumina or silica-alumina, more preferably the refractory oxide is alumina.

The oxygen storage component typically comprises, or consists essentially of, ceria.

The internal combustion engine may be a gasoline engine or a diesel engine. It is preferred that the internal combustion engine is a diesel engine, particularly for the first, second and third emissions control device embodiments of the invention. For the fourth emissions control device embodiment of the invention, it is preferred that the internal combustion engine is a gasoline engine.

Defintions

As used in this specification and the appended claims, the singular forms "a", "an" and "the" include plural referents unless the context clearly indicates otherwise. Thus, for example, reference to "a particulate material" includes a mixture of two or more particulate materials, and the like.

The term "mixed oxide" as used herein generally refers to a mixture of oxides in a single phase, as is conventionally known in the art. The term "composite oxide" as used herein generally refers to a composition of oxides having more than one phase, as is conventionally known in the art.

The expression "about" as used herein with reference to an end point of a numerical range includes the exact end point of the specified numerical range. Thus, for example, an expression defining a parameter as being up to "about 0.2" includes the parameter being up to and including 0.2.

The term "substantially vertically" used herein with reference to holding the substrate refers to an arrangement where the central axis of the substrate is ±5° from the vertical, preferably ±3° from the vertical, such as ±0° from the vertical (i.e. perfectly vertical within measurement error).

Any reference to a "vacuum" as used herein refers to a pressure that is below atmospheric pressure. The term "vacuum" is not to be interpreted in its literal sense of a space that is completely devoid of matter. The strength of the vacuum that is applied to the substrate will depend on the composition of the liquid and the type of substrate that is being used. The vacuum should be strong enough to clear the cells of the substrate so that there are no blockages. Such vacuum strengths or reduced pressures are well known in the art.

The expression "consist essentially" as used herein limits the scope of a feature to include the specified materials, and any other materials or steps that do not materially affect the basic characteristics of that feature, such as for example minor impurities. The expression "consist essentially of" embraces the expression "consisting of".

EXAMPLES

The invention will now be illustrated by the following non-limiting examples.

General Procedures and Methods

Established coating methods are according to the disclosure and teaching of WO99/47260, WO2011/080525, and WO2014/19568.

Example 1

A gamma-alumina suspension was prepared by mixing the appropriate amount of powder with water. The pH was adjusted to 5.5 with $HNO_3$ and the suspension stirred to homogenize. The suspension was milled to a $d_{50}$ of <6 microns.

To a portion of this suspension, valeric acid (1.6% of the mass of Alumina) was added and the pH adjusted to 4.8, with $NH_3$. Air was introduced into the suspension using a Kenwood Chef Classic™ food mixer with a whisk attachment, stirring at maximum speed for 10 minutes to produce a foam with 5.9 times the volume of the starting suspension.

The foam was aged for three days during which no liquid drainage, drying or coarsening of the bubble structure was observed.

Example 2

Boehmite powder (an alumina supplied by Sasol) was added to demineralised water. This suspension was stirred for three hours. A Cu exchanged small pore zeolite with the CHA structure and SAR 25 (3.0 wt. % Cu) was added slowly (Zeolite:Boehmite ratio 9:1). The total solids content of this suspension was 31 wt %.

To a portion of this suspension, valeric acid (of varying quantities described in Table 1) was added and the pH adjusted, when needed, to 4.8 with $NH_3$ Air was introduced into each portion of the suspension using a Kenwood Chef Classic™ food mixer with a whisk attachment, stirring at maximum speed for 10 minutes to produce a foam.

TABLE 1

Foam Samples Summary of EXAMPLE 2

| Sample ID | Solids wt. % | Valeric Acid mmol/g solids | Initial Volume (ml) | Foam Volume (ml) |
|---|---|---|---|---|
| A | 19.97 | 0.085 | 150 | 300 |
| B | 19.97 | 0.180 | 150 | 1200 |
| C | 18.84 | 0.173 | 150 | 200 |
| D | 31.00 | 0.109 | 150 | 1200 |
| E | 29.95 | 0.056 | 150 | 1100 |
| F | 31.39 | 0.082 | 100 | 700 |
| G | 30.67 | 0.210 | 150 | 1200 |
| H | 19.82 | 0.122 | 150 | 1100 |
| I | 20.15 | 0.274 | 150 | 1250 |
| J | 20.34 | 0.288 | 150 | 1200 |

Figure 1B:
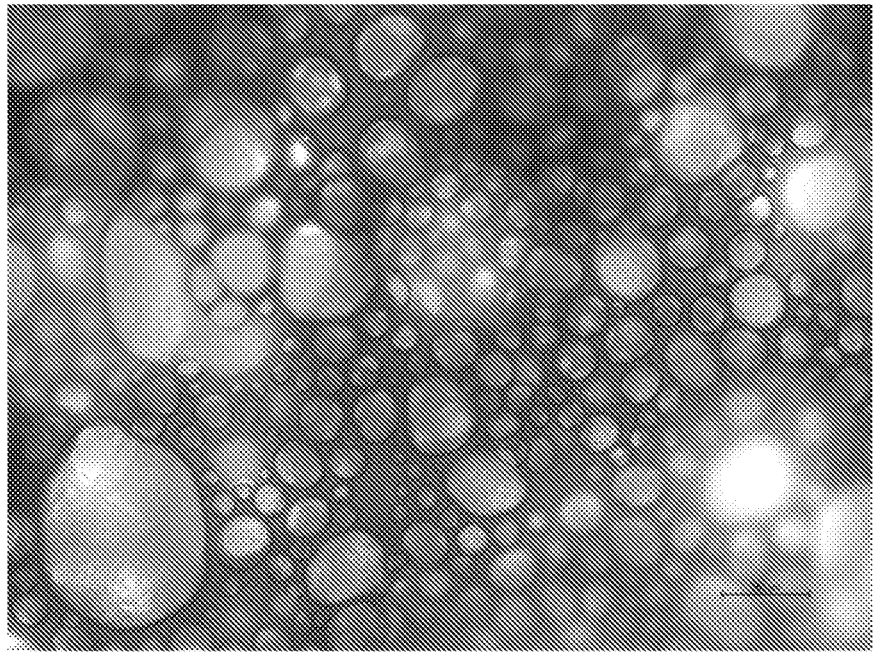
FIG. 1B shows an image from an optical microscope of the fresh foam of sample I in EXAMPLE 2 (at 5× magnification and scale bar 0.25 mm).

FIG. 1a shows fresh foam optical microscope characterization of sample I (at 5× magnification and scale bar 0.20 mm). FIG. 1b shows fresh foam optical microscope characterization of sample I (at 5× magnification and scale bar 0.25 mm).

Example 3

SCR Foam Coating Test

A suspension was prepared by diluting and then stirring a suspension of similar composition to the one in EXAMPLE 2 until it became homogeneous.

To a portion of this suspension, valeric acid (2.1% of the mass of solid component) was added and the pH adjusted to 4.8 with of tetra-n-propyl-ammonium hydroxide. Air was introduced into the suspension using a Kenwood Chef Classic™ food mixer with a whisk attachment, stirring at maximum speed for 10 minutes to produce a foam.

The foam was introduced to the outlet end of a 1 inch core taken from a cordierite flow-through substrate using a vacuum applied from the inlet end. The core was dried and then calcined at 500° C. for 2 h.

Figure 2A:
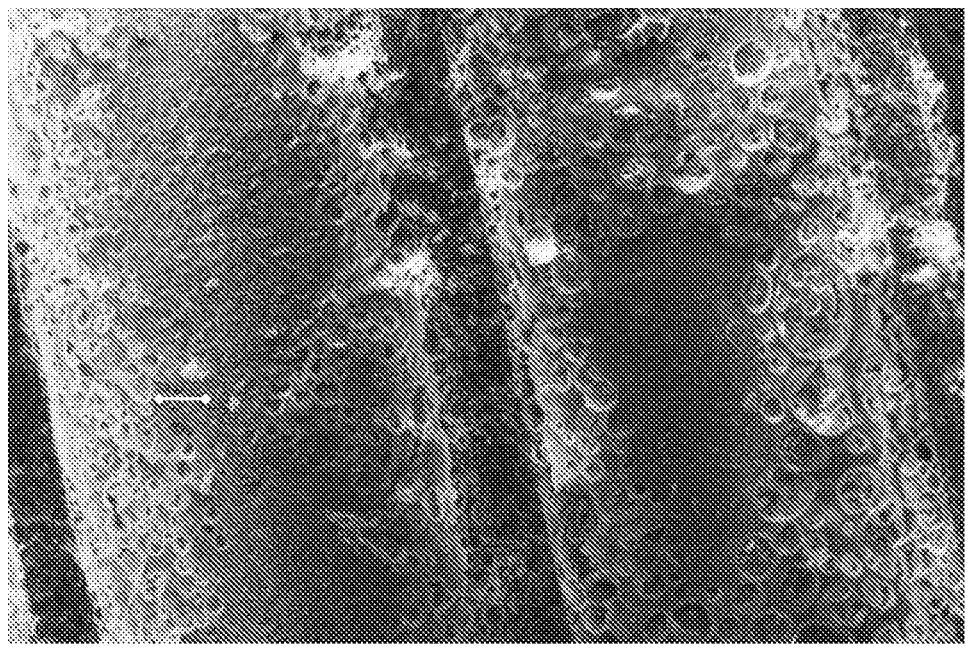
FIG. 2A shows a scanning electron micrograph of the solid foam in Example 3.
Figure 2B:
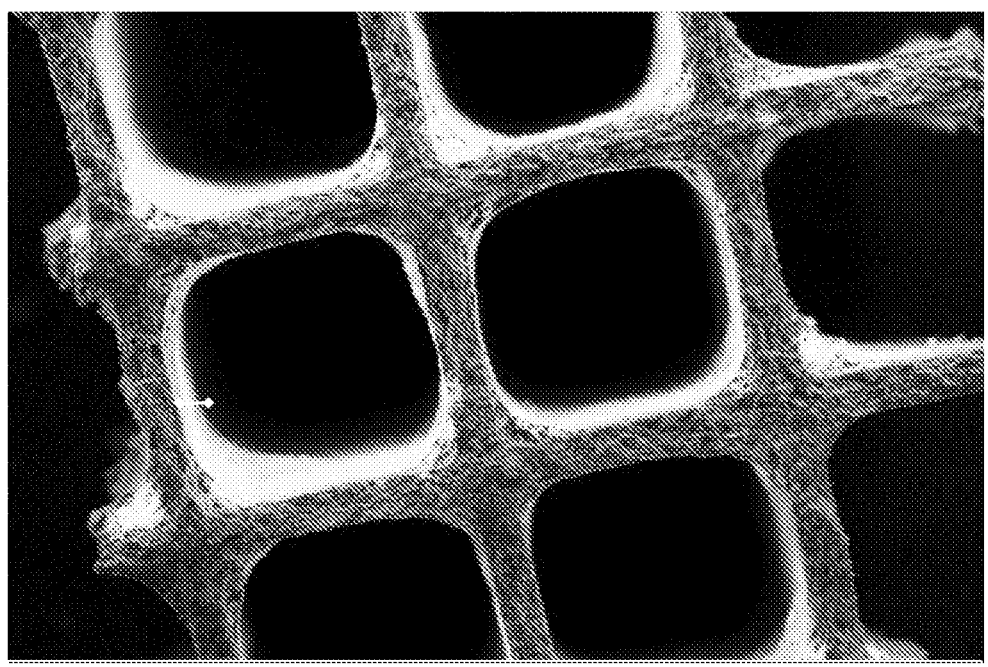
FIG. 2B shows a scanning electron micrograph of a cross-section of the cell walls with the solid foam on the cell walls in Example 3.

As shown in FIG. 2, scanning electron microscopy of the coated core indicates that the solid foam coating forms a uniform layer on the cell walls. Open bubbles are visible at the surface of the solid foam layer. The images were taken in the following conditions: 2a) acceleration voltage 20 kV, magnification 42×, working distance 18 mm, secondary electron detector, scale bar 0.20 mm, 2b) acceleration voltage 20 kV, magnification 28×, working distance 13 mm, secondary electron detector, scale bar 0.20 mm.

Example 4

SCRF Foam Coating Test

Three suspensions, each as in EXAMPLES 2 and 3 were prepared. To each of these valeric acid (quantity as described in Table 2) was added and the pH adjusted to a target of 4.75 with of tetra-n-propyl-ammonium hydroxide (TPAOH). Air was introduced into the suspensions using a Kenwood Chef Classic™ food mixer with a whisk attachment, stirring at maximum speed for 10 minutes to produce a foam.

TABLE 2

| Suspension ID | 4a | 4b | 4c |
|---|---|---|---|
| Suspension solids content (wt %) | 30 | 30 | 30 |
| Valeric acid quantity (wt % of solid component) | 0.82 | 0.82 | 0.82 |
| TPAOH quantity (wt % of solid component) | 1.76 | 1.76 | 1.76 |
| Starting pH | 4.54 | 4.54 | 4.6 |
| pH after valeric acid addition | 4.38 | 4.38 | 4.41 |
| pH after TPAOH addition | 4.74 | 4.74 | 4.73 |

Example 4a 196.6 g of suspension 4a was applied to the outlet channels of a SiC filter substrate having 300 cells per square inch using a method as described in WO2011/080525. The foam coating was dried using forced air flow and calcined at 500° C. The coated substrate was cut longitudinally to examine the coat depth and the coating examined using SEM.

Figure 3:
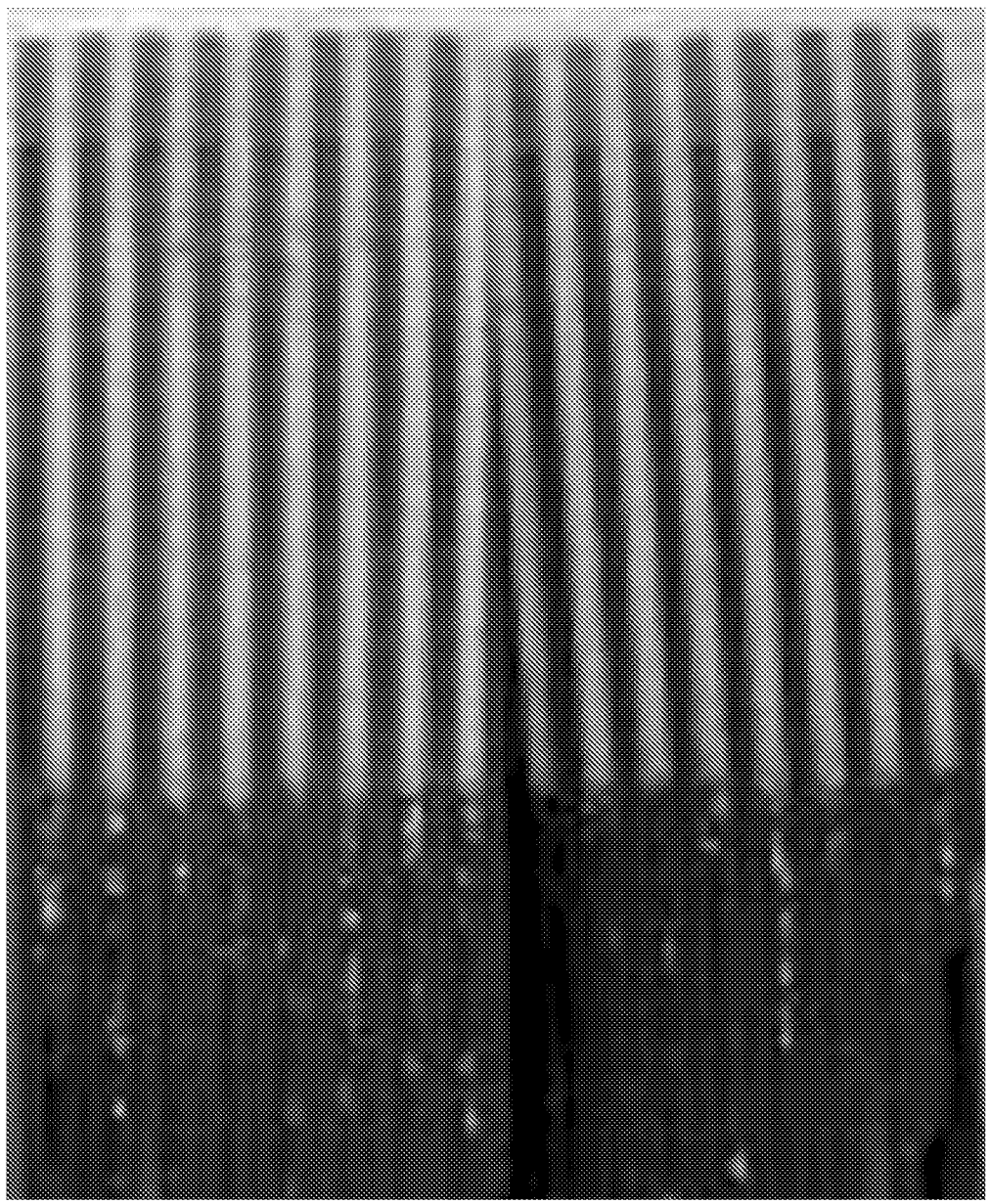
FIG. 3 shows an image of the coating of suspension in EXAMPLE 4a on one segment of the substrate after it has been cut longitudinally.

FIG. 3 shows the coating of suspension 4a on one segment of the substrate after it has been cut longitudinally.

Figure 4A:
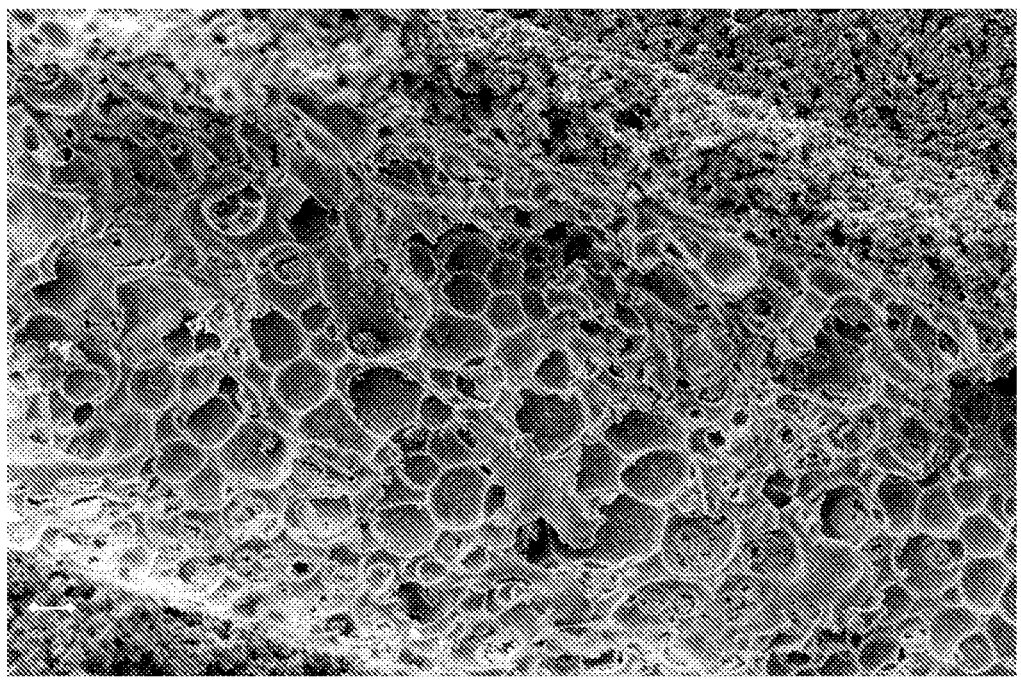
FIGS. 4A and 4B show SEM images of the coated filter in EXAMPLE 4a, 4A is an image of the coating surface and 4B shows an image of the cross-section thereof.
Figure 4B:
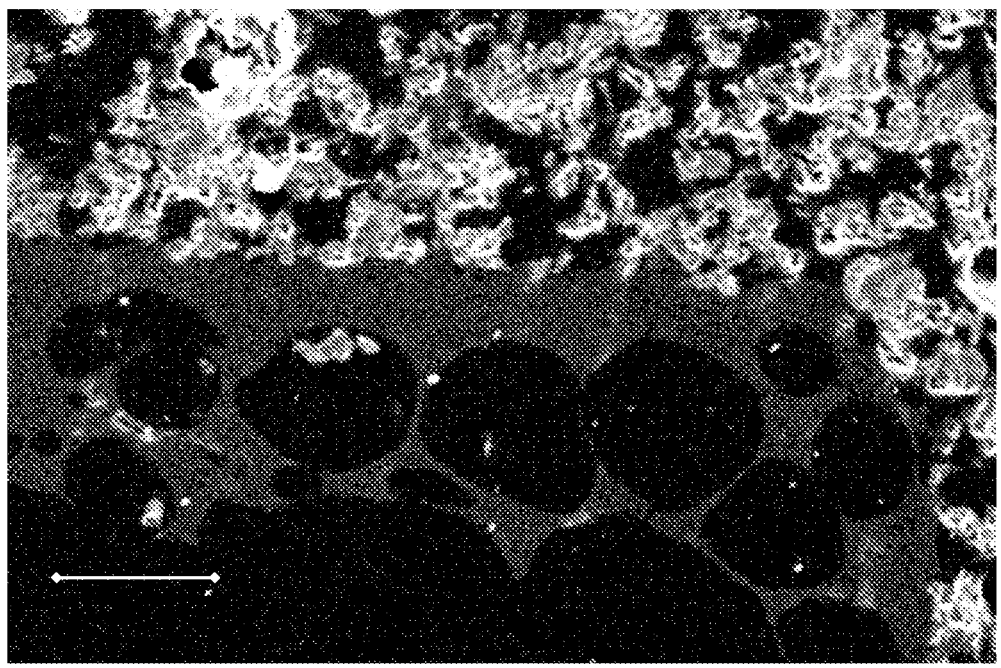

The foam coating depth was 38 mm when measured from the outlet side. The catalyst had a coating loading of 1.2 g·in$^{-3}$ in the coated portion. The distribution of the coating into the channels looks homogeneous; the coating surface is highly rough. The bubble-like features have a size distribution ranging from 50 μm to 200 μm, and appear to be frequently interconnected either by cracks or holes in the bubble wall. FIG. 4 shows SEM images of the coated filter, 4a of the coating surface and 4b in cross-section. The images were taken in the following conditions: 4a) acceleration voltage 20 kV, magnification 45×, working distance 14 mm, secondary electron detector, scale bar 0.10 mm, 4b) acceleration voltage 20 kV, magnification 200×, working distance 13 mm, secondary electron detector, scale bar 0.10 mm.

The cross-sections show that the coating forms a dense, thin, on-wall layer, on top of which a more rough and open structure is formed. The coating does not penetrate into the substrate pores. Both the inlet channels and the in-wall pores of the outlet channels are free from coating. The thickness of the dense on-wall layer is variable, and the degree of open porous structures formed on top of it changes across the sample too. The dense layer shows some inter-particle porosity, in the range of 1-5 μm.

Example 4b

Two portions of suspension 4b were applied to the inlet channels of a SiC filter substrate having 300 cells per square inch using a method as described in WO2011/080525. The first application was 223.3 g of foam, the second 143.0 g of foam. The foam coating was dried using forced air flow after each application and finally calcined at 500° C. The coating was examined using SEM.

Figure 5A:
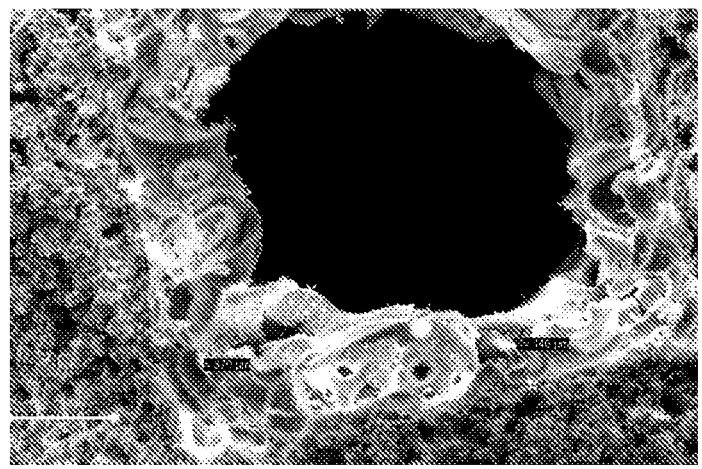
FIGS. 5A-5C show SEM images of the coated filter in EXAMPLE 4b.
Figure 5B:
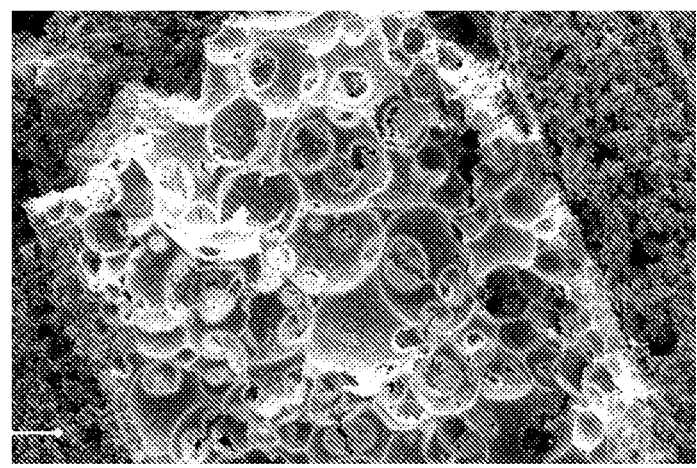
Figure 5C:
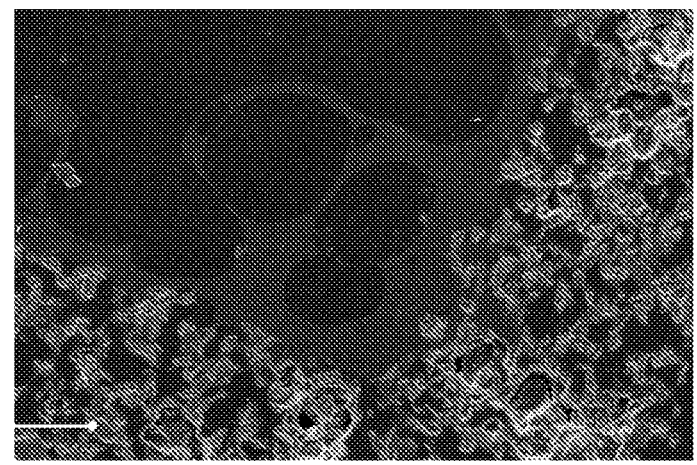

FIG. 5 shows SEM images of the coated filter, 5b of the coating surface and 5a and 5c in cross-section. The images were taken in the following conditions: 5a) acceleration voltage 20 kV, magnification 88×, working distance 16 mm, secondary electron detector, scale bar 0.20 mm, 5b) acceleration voltage 20 kV, magnification 81×, working distance 18 mm, secondary electron detector, scale bar 0.10 mm, 5c) acceleration voltage 20 kV, magnification 150×, working distance 13 mm, secondary electron detector, scale bar 0.10 mm.

The coating has formed a thick homogeneous layer on the substrate wall. The thickness next to the corners is around 350 μm, along the walls is around 150 μm. The coating forms a very rough surface, with open pores interconnected by cracks or holes in the bubble wall. Much smaller pores are found in between the particles forming the bubble wall.

Example 4c

Three portions of suspension 4c were applied to the outlet channels of a SiC filter substrate having 300 cells per square inch using a method as described in WO2011/080525. The first application was 191.1 g of foam, the second 170.8 g of foam and the third 193.6 g of foam. The foam coating was dried using forced air flow after each application and finally calcined at 500° C. The coating was examined using SEM.

Figure 6A:
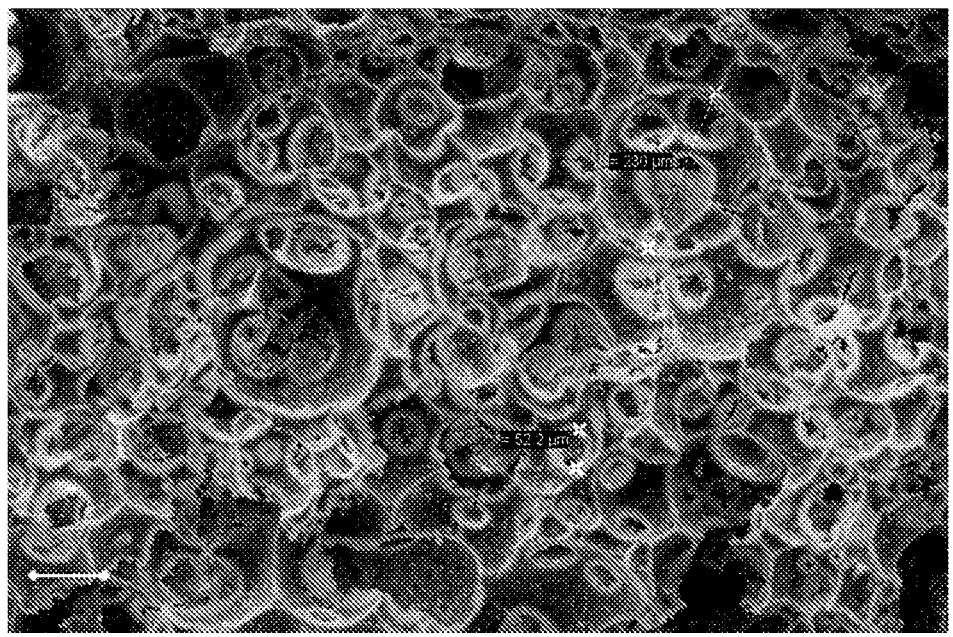
FIGS. 6A and 6B show SEM images of the coated filter in EXAMPLE 4c, FIG. 6A of the coating surface and FIG. 6B in cross-section.
Figure 6B:
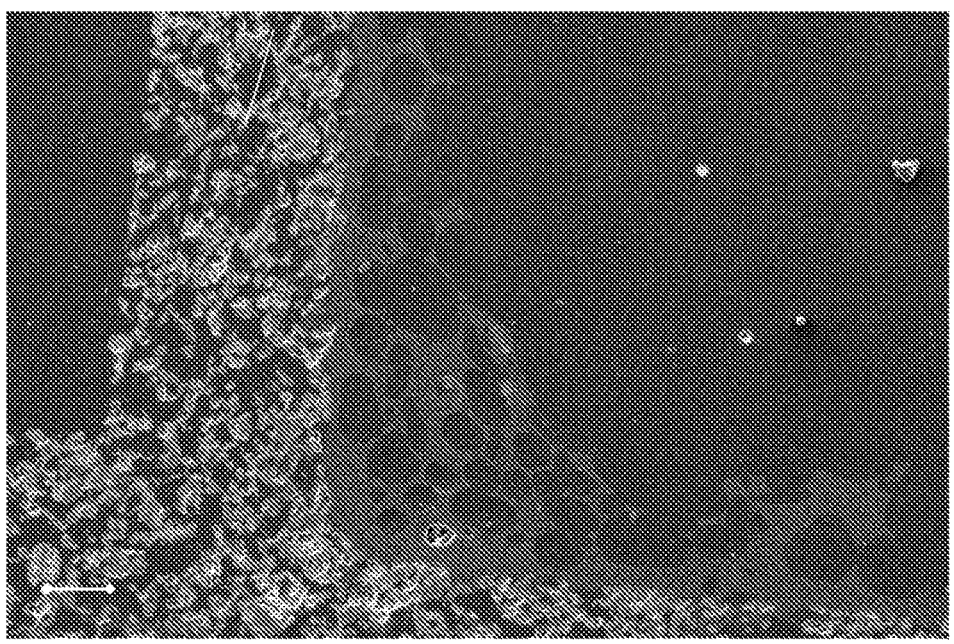

FIG. 6 shows SEM images of the coated filter, 6a of the coating surface and 6b in cross-section. The images were taken in the following conditions: 6a) acceleration voltage 20 kV, magnification 90×, working distance 14 mm, secondary electron detector, scale bar 0.10 mm, 5b) acceleration voltage 20 kV, magnification 80×, working distance 12 mm, secondary electron detector, scale bar 0.10 mm.

The coating looks homogeneous; the coating surface is highly rough. The bubble-like features have a wide size distribution ranging from 50 μm to 250 μm, and appear to be frequently interconnected either by cracks or holes in the bubble wall. The overall thickness of the layer around the corners is 300 μm, on the channels is roughly 160 μm.

The cross-sections show that the coating forms a dense, on-wall layer, on top of which a more rough and open structure is formed. The average thickness of the bottom dense layer varies considerably along the channels, from 20 to 150 μm, depending on the presence and number of bubbles in the area.

Example 5

Short Coating Depth Test

Example 5a

Filter ASC Stripe

The filter was coated with a conventional SCR washcoat layer for a filter before applying the foam coating layer.

A suspension was prepared by adding gamma-alumina powder to water and milled to $d_{50}$ of less than 4.5 micron. A soluble salt of Pt and 0.5% hydroxyethylcellulose was added. The suspension was stirred to homogenize.

To a portion of this suspension propyl-gallate (2.2% of the mass of the solid component) was added and stirred until homogeneous. Air was introduced into the suspension using a Kenwood Chef Classic™ food mixer with a whisk attachment, stirring at maximum speed for 10 minutes to produce a foam.

The foam was applied to the outlet channels of a SiC filter substrate having 300 cells per square inch using a method as described in WO2011/080525. The foam coating was dried using forced air flow and calcined at 500° C. The foam coating depth was 5 mm when measured from the outlet side. The resulting catalyst had a Pt loading of 14 g·ft$^{-3}$ and a coating loading of 0.4 g·in$^{-3}$ of solid foam in the coated portion.

Figure 7:
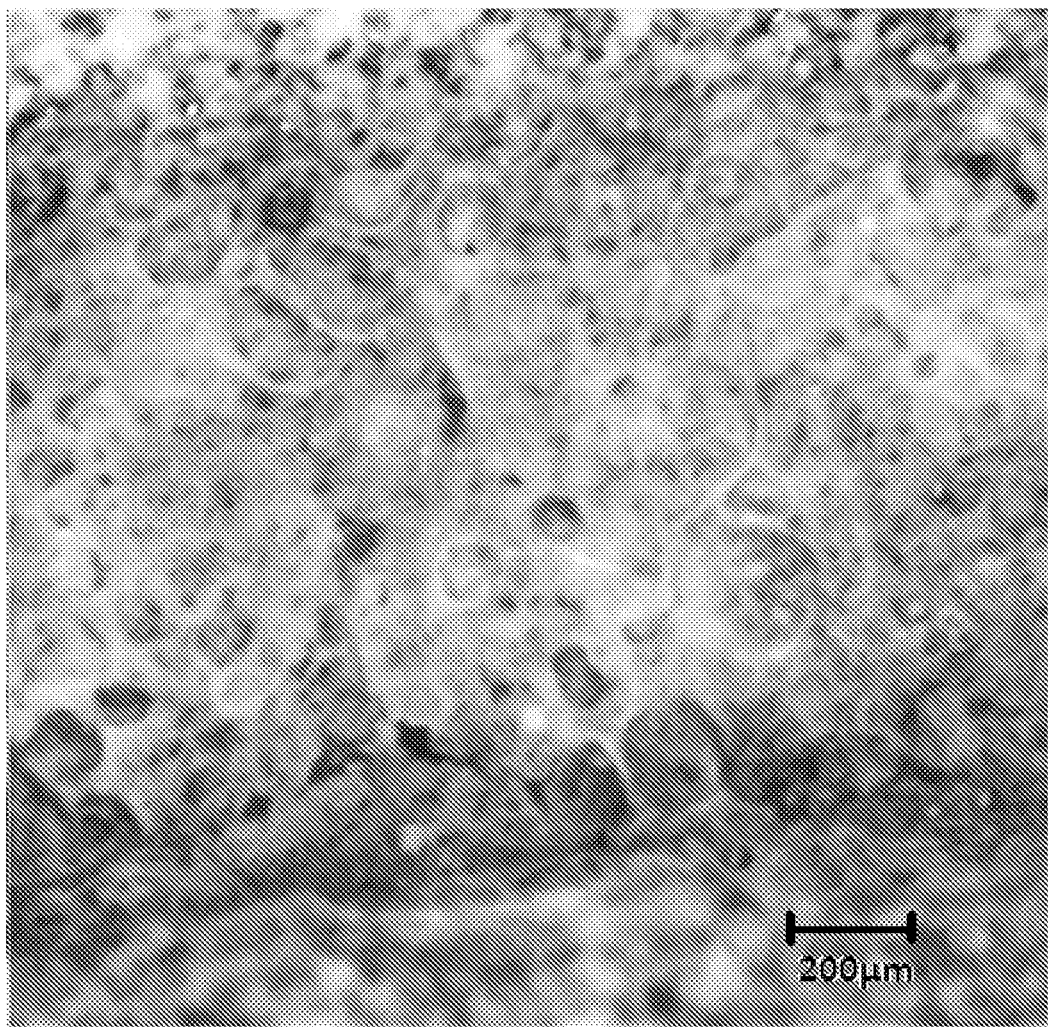

The catalyst was cut longitudinally in two perpendicular planes. As shown in FIG. 7, using an optical microscope to view the surface of the solid foam layer it could be determined that the solid foam had an open-cell structure with bubbles between 5 and 140 μm.

The coat depth of the solid foam layer was measured in 10 positions evenly spaced across the two cut planes. The measured coat depths had a mean of 4.8 mm and a standard deviation of 0.4 mm.

Example 5b

Flow Through ASC Stripe

A suspension was prepared by adding gamma-alumina powder (SCFa-140, supplied by Sasol) to water and milled to $d_{50}$ of less than 4.5 micron. A soluble salt of Pt and 0.5% hydroxyethylcellulose was added. The suspension was stirred to homogenize.

To a portion of this suspension valeric acid (1.65% of the mass of the solid component) was added and the pH adjusted to 4.8 with NH$_3$. Air was introduced into the suspension using a Kenwood Chef Classic™ food mixer with a whisk attachment, stirring at maximum speed for 10 minutes to produce a foam.

The foam was applied to the outlet channels of a cordierite flow-through substrate having 300 cells per square inch using a method as described in WO2011/080525. The foam coating was dried using forced air flow and calcined at 500° C. The foam coating depth was 16.1 mm when measured from the outlet side. The resulting catalyst had a Pt loading of 60 g·ft$^{-3}$ and a coating loading of 1.4 g·in$^{-3}$ in the coated portion.

Figure 8:
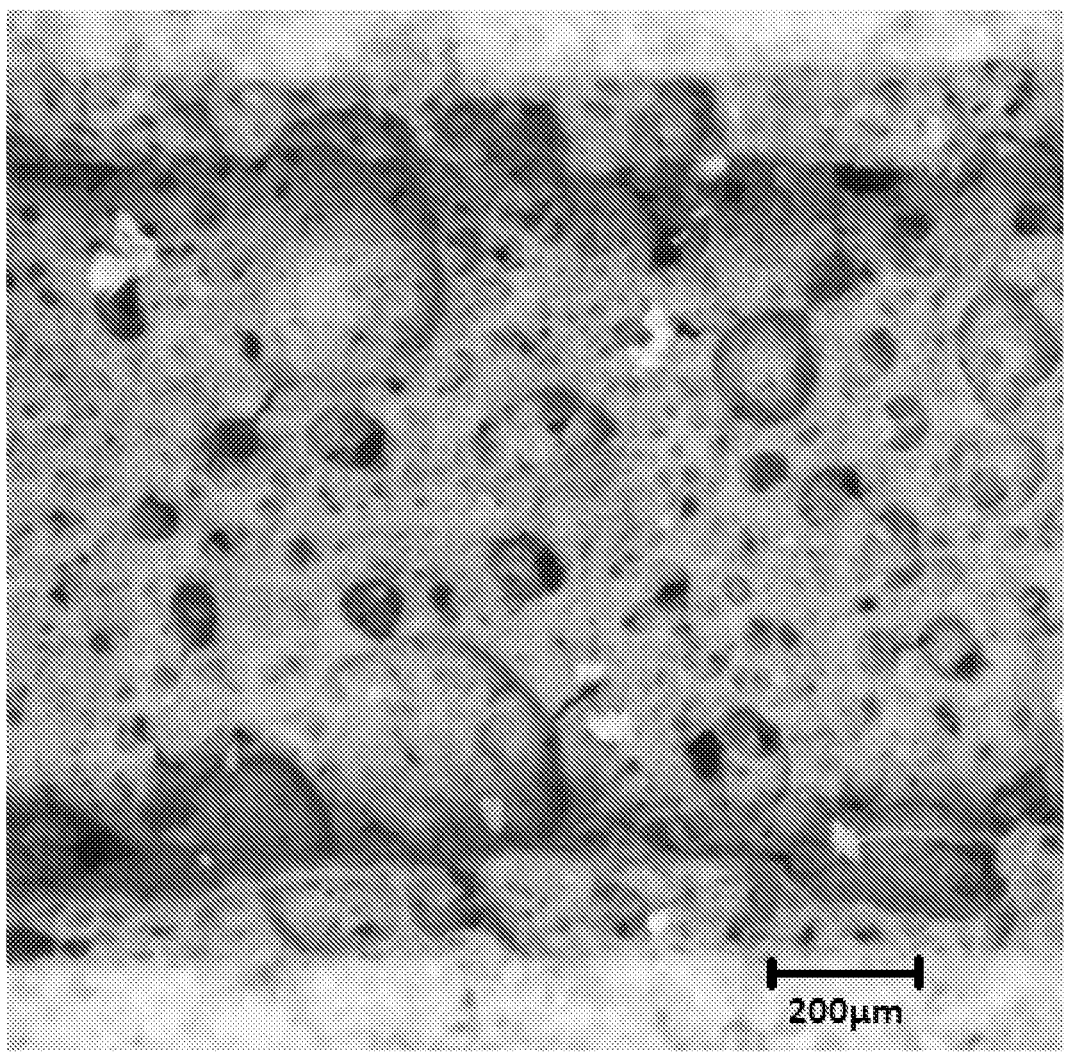
FIG. 8 shows the optical microscope image of the coated catalyst in EXAMPLE 5b.

The catalyst was cut longitudinally in two perpendicular planes. As shown in FIG. 8, using an optical microscope to view the surface of the solid foam layer it could be determined that the solid foam had an open-cell structure with bubbles between 20 and 250 μm.

The coat depth of the solid foam layer was measured in 10 positions evenly spaced across the two cut planes. The measured coat depths had a mean of 15.7 mm and a standard deviation of 0.7 mm.

As shown in Table 3 below, a wide range of dosages have been applied to flow-through substrates to achieve different short coat depths.

TABLE 3

| | Coating Parameters | | |
| --- | --- | --- | --- |
| Part ID | Foam Dose Weight (g) | Wt % of Hydroxyethylcellulose Used | Coat Depth (mm) |
| ASC-1 | 107 | 0 | 78.4 |
| ASC-2 | 32 | 0 | 10.36 |
| ASC-3 | 70 | 0.5 | 18.34 |
| ASC-4 | 38 | 0.5 | 11.48 |
| ASC-5 | 52 | 0.5 | 16.1 |
| ASC-6 | 48 | 0.5 | 19.46 |
| ASC-7 | 67 | 0 | 41.3 |
| ASC-8 | 34 | 0 | 16.1 |
| ASC-9 | 14 | 0 | 6.3 |

Example 6

DOC Coating (Non-Foamed)

Silica-alumina powder was slurried in water and milled to a $d_{90}$ <20 micron. Barium acetate was added to the slurry followed by appropriate amounts of soluble platinum and palladium salts. Beta zeolite was added such that the slurry comprised 77% silica-alumina and 23% zeolite by mass. The slurry was then stirred to homogenise. The resulting washcoat was applied to the inlet channels of the flow through monolith using established coating techniques as described in WO99/47260. It was then dried and calcined at 500° C.

A second slurry of silica-alumina powder in water was milled to a $d_{90}$ <20 micron. Soluble platinum salt was added followed by manganese nitrate. The mixture was stirred to homogenize. The slurry was applied to the outlet end of a cordierite flow through monolith using established coating techniques as described in WO99/47260. It was then dried and calcined at 500° C. The manganese loading on the part was 50 g ft$^{-3}$. The finished catalyst had a total Pt loading of 112.5 g ft$^{-3}$ and Pd loading of 37.5 g ft$^{-3}$.

Example 7

Pt Volatility Capture Region (Foamed)

Preformed Pd on alpha alumina with a specific surface area (SSA) of <10 m$^2$/g, comprising 1.2 wt % Pd, was slurried in water and milled to a $d_{90}$ <20 micron. Activated boehmite slurry was added as binder (as 10% of the total solids content) and water added until the suspension had 25% total solids content. 0.6 wt % cellulose-based thickener was added to the suspension. Subsequently, this suspension was pH adjusted to pH 4.7 with aqueous ammonia, and valeric acid (0.2%) added. Air was introduced into the suspension using a gas inducing impeller for 15 minutes, to produce a stable foam.

Figure 12:
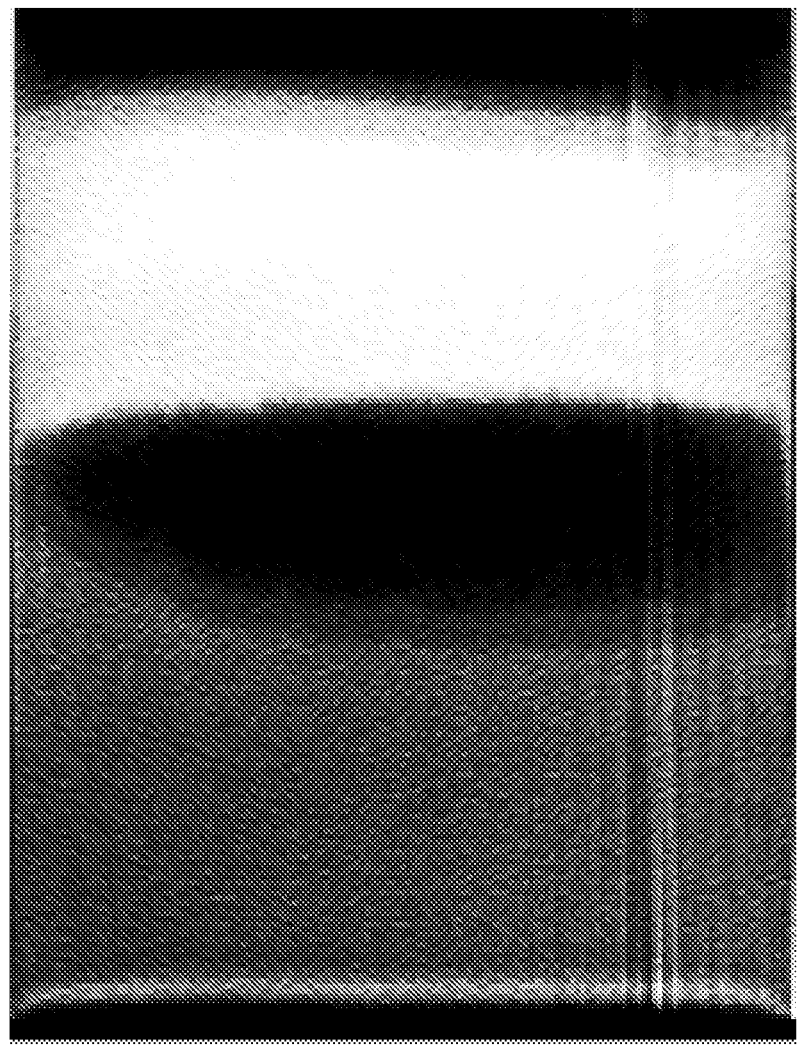
FIG. 12 shows an x-ray image of the coated monolith from EXAMPLE 7, comprising the DOC coating of EXAMPLE 6 with the foamed capture region for volatilized Pt. In this figure, the outlet is at the top of the image, with the short (6-10 mm) foamed coating visible as the dark band directly on the outlet.

The foam was then dosed onto the outlet face of a round, 143.8 mm diameter, 97 mm length flow through monolith using established coating techniques as described in WO2011/080525, giving a coating depth of 8 mm. The part was dried and calcined at 500° C. FIG. 12 shows an x-ray image of the coated monolith from EXAMPLE 7, comprising the DOC coating of EXAMPLE 6 with the foamed Pt volatility coating. In this figure, the outlet is at the top of the image, with the short (6-10 mm) foamed coating visible as the dark band directly on the outlet.

By applying similar techniques, in some embodiments, the coating depth is in a range of 6-10 mm.

Pt Volatility Tube Furnace

Tests were performed on a first synthetic catalytic activity test (SCAT) laboratory reactor illustrated in FIG. 9, in which an aged core of a coated Cu/CHA zeolite SCR catalyst was disposed in a conduit downstream of a core of either EXAMPLE 6 or 7. A synthetic gas mixture was passed through the conduit at a rate of 6 litres per minute. A furnace was used to heat (or "age") the DOC samples at steady-state temperature at a catalyst outlet temperature of 900° C. for 2 hours. The SCR catalyst was disposed downstream of the DOC sample and was held at a catalyst temperature of 300° C. during the ageing process by adjusting the length of tube between the furnace outlet and the SCR inlet, although a water cooled heat exchanger jacket could be used as appropriate. Temperatures were determined using appropriately positioned thermocouples ($T_1$ and $T_2$). The gas mixture used during the ageing was 40% air, 50% $N_2$, 10% $H_2O$.

Performance Results—SCR $NO_x$ Test

Figure 11:
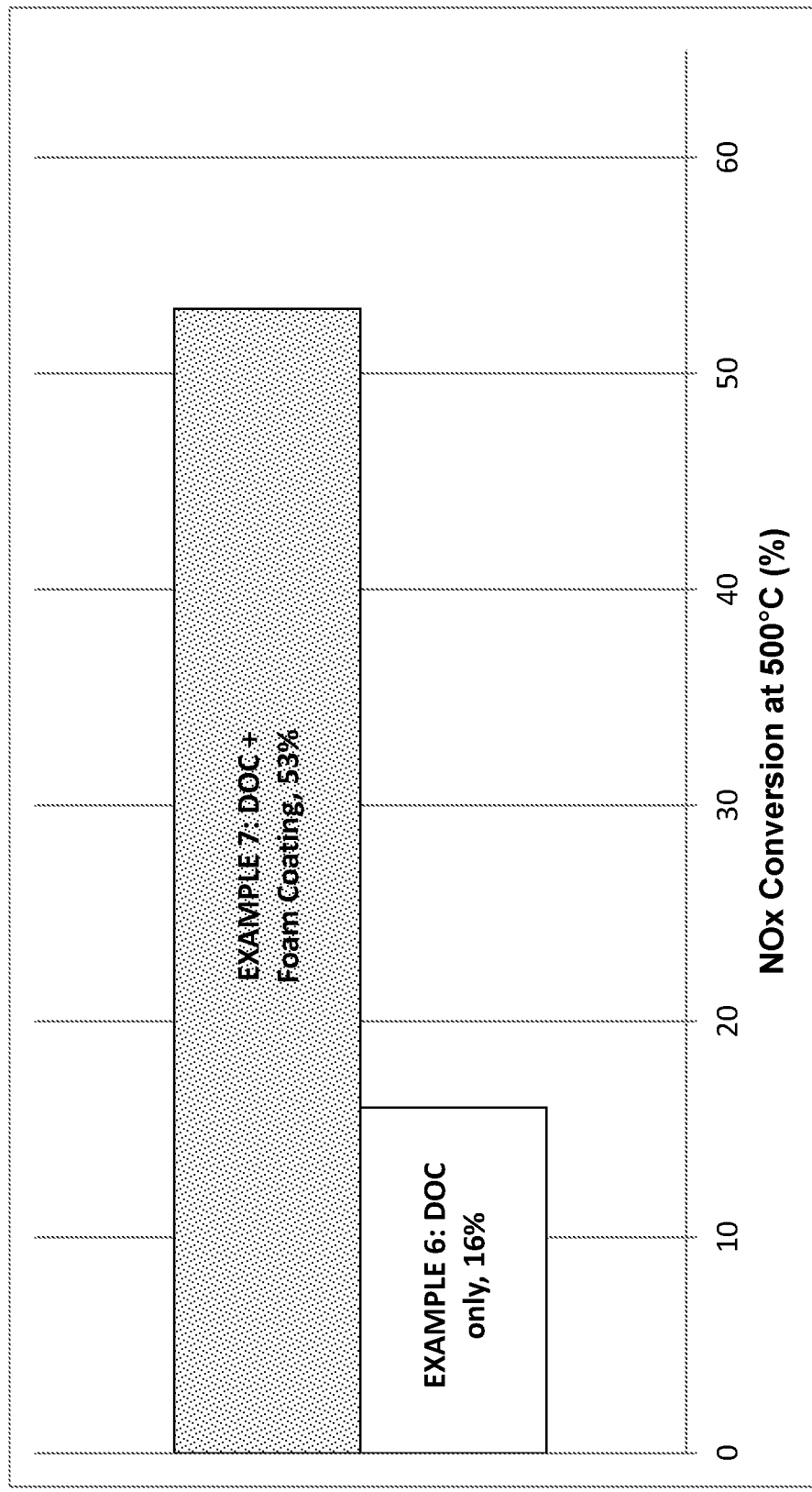
FIG. 11 is a chart showing the $NO_x$ conversion activity of SCR cores aged behind DOC cores with and without a foamed capture region for volatilized Pt, when run on an SCR SCAT test. It shows that the SCR core aged behind EXAMPLE 7 (with the foam coating countermeasure) maintains higher $NO_x$ conversion activity than the SCR core aged behind EXAMPLE 7, which has no foam coating.

SCR cores were tested for NOx conversion activity using a synthetic gas bench reactor. The test was run at 500° C. using a synthetic gas mixture ($O_2$=10%; $H_2O$=5%; $CO_2$=7.5%; $NH_3$=325 ppm; NO=500 ppm; $NO_2$=0 ppm; $N_2$=balance, i.e. an alpha value of 0.65 was used (ratio of $NH_3$:$NO_x$), so that the maximum possible $NO_x$ conversion available was 65%) and the resulting $NO_x$ conversion is shown in FIG. 11.

For the avoidance of any doubt, the entire content of any and all documents cited herein is incorporated by reference into the present application.

The invention claimed is:

1. A method of coating a substrate with a foam, wherein the method comprises:
   (a) introducing a particle-stabilized, alumina-based foam into a substrate comprising a plurality of channels through open ends of the channels at a first end of the substrate; and
   (b) applying at least one member selected from the group consisting of (i) a vacuum to open ends of the channels at a second end of the substrate, wherein the vacuum draws the foam into the substrate through the open ends of the channels at the first end, and (ii) a pressure to the open ends of the channels at the first end of the substrate wherein the pressure pushes or blows the foam into the substrate through the open ends of the channels at the first end,
   wherein the substrate is constructed of a material containing at least one of silicon carbide, aluminium nitride, silicon nitride, aluminium titanate, cordierite, mullite, pollucite, a thermet, an Fe—Cr—Al alloy, a Ni—Cr—Al alloy, and a stainless-steel alloy;
   wherein the substrate is a honeycomb monolith substrate having a plurality of channels that extend longitudinally along the length of the substrate; and
   wherein the foam comprises a particulate material.

2. A method according to claim 1 further comprising the step of (c) drying and/or calcining the substrate containing the particle stabilized foam to obtain a solid foam layer disposed or supported on the substrate.

3. A method according to claim 2, wherein the solid foam layer comprises an open cell structure.

4. A method according to claim 2, wherein the solid foam layer has a cell volume, wherein more than 20% of the cell volume is interconnected.

5. A method according to claim 1, wherein step (a) comprises the steps of (i) holding the substrate substantially vertically and (ii) pushing or injecting the foam into the substrate through the open ends of the channels at the first end.

6. A method according to claim 5, wherein step (ii) pushing or injecting the foam into the substrate, then this may be (ii) pushing or injecting the foam using a piston.

7. A method according to claim 1, wherein the foam is obtained by a method comprising the steps of: (i) preparing a suspension of the particulate material in an aqueous medium; and (ii) foaming the suspension by introducing a gas into the suspension to generate a particle-stabilised foam.

8. A method according to claim 7, wherein step (i) is a step of preparing a suspension of a particulate material in an aqueous medium containing an amphiphile.

9. A method according to claim 1, wherein step (a) comprises the steps of: (i) locating a containment means on top of the first end of the substrate, (ii) dosing the foam into the containment means.

10. A method according to claim 1, wherein the particulate material has a median particle size of 1 nm to 50 μm.

11. A method according to claim 1, wherein the foam contains bubbles having a diameter from 1 μm to 1 mm.

12. A method according to claim 1 wherein step (b) comprises applying a vacuum to open ends of the channels at a second end of the substrate, wherein the vacuum draws the foam into the substrate through the open ends of the channels at the first end.

13. A method according to claim 1 wherein the particulate material is a catalytic material comprising a catalytically active metal supported on a support material.

14. A method according to claim 1 wherein the foam contains bubbles having a diameter from 10 to 300 µm.

* * * * *